US012800451B2

(12) United States Patent
Tajima

(10) Patent No.: US 12,800,451 B2
(45) Date of Patent: Nov. 17, 2026

(54) BIO-RELATED SUBSTANCE EXTRACTING DEVICE AND PROCESSING SYSTEM

(71) Applicant: UNIVERSAL BIO RESEARCH CO., LTD., Chiba (JP)

(72) Inventor: Hideji Tajima, Chiba (JP)

(73) Assignee: UNIVERSAL BIO RESEARCH CO., LTD., Chiba (JP)

(*) Notice: Subject to any disclaimer, the term of this patent is extended or adjusted under 35 U.S.C. 154(b) by 452 days.

(21) Appl. No.: 18/579,780

(22) PCT Filed: Jul. 20, 2022

(86) PCT No.: PCT/JP2022/028147
§ 371 (c)(1),
(2) Date: Jan. 16, 2024

(87) PCT Pub. No.: WO2023/008270
PCT Pub. Date: Feb. 2, 2023

(65) Prior Publication Data

US 2024/0319052 A1 Sep. 26, 2024

(30) Foreign Application Priority Data

Jul. 26, 2021 (JP) ................................ 2021-121766
Jan. 20, 2022 (JP) ................................ 2022-007079

(51) Int. Cl.
*B01L 3/00* (2006.01)
*B01D 15/08* (2006.01)
(Continued)

(52) U.S. Cl.
CPC ................ *G01N 1/34* (2013.01); *B03C 1/01* (2013.01); *B03C 1/288* (2013.01); *B03C 1/30* (2013.01); *B03C 2201/18* (2013.01)

(58) Field of Classification Search
CPC ................ G01N 1/34; G01N 35/1083; G01N 2035/00356; G01N 2035/00524;
(Continued)

(56) References Cited

U.S. PATENT DOCUMENTS

| | | | |
|---|---|---|---|
| 6,509,193 | B1 | 1/2003 | Tajima |
| 10,399,048 | B2 | 9/2019 | Siow et al. |

(Continued)

FOREIGN PATENT DOCUMENTS

| | | | |
|---|---|---|---|
| CN | 1063767310 | | 2/2017 |
| CN | 110068493 | A | 7/2019 |

(Continued)

OTHER PUBLICATIONS

International Search Report and Written Opinion received in PCT/JP2022/028147 mailed Oct. 11, 2022.

*Primary Examiner* — Oyeleye Alexander Alabi
(74) *Attorney, Agent, or Firm* — Meunier Carlin & Curfman LLC

(57) ABSTRACT

An extracting device 200 includes a plurality of extraction vessels 210 which retain a solution containing magnetic particles and a sample, an oscillating mechanism 220 which oscillates the extraction vessels 210, magnet bodies which exert a magnetic force on extraction vessels 210, a magnet moving mechanism 258, 259 which moves the magnet bodies between a contact position in which the magnet bodies are in contact with the extraction vessels 210 and a non-contact position, a temperature adjustment unit which adjusts a temperature of the extraction vessels 210, a temperature adjustment unit moving mechanism 248, 249 which moves the temperature adjustment unit between a contact position in which the temperature adjustment unit is in contact with the extraction vessels 210 and a non-contact position in which the temperature adjustment unit is not in
(Continued)

contact with the extraction vessels 210, and a control unit which controls an action of each of the mechanisms.

15 Claims, 25 Drawing Sheets

(51) Int. Cl.

| | |
|---|---|
| ***B01F 33/302*** | (2022.01) |
| ***B01F 33/3033*** | (2022.01) |
| ***B01J 8/00*** | (2006.01) |
| ***B01J 8/02*** | (2006.01) |
| ***B01J 20/285*** | (2006.01) |
| ***B01J 20/287*** | (2006.01) |
| ***B01J 20/32*** | (2006.01) |
| ***B01L 7/00*** | (2006.01) |
| ***B01L 9/00*** | (2006.01) |
| ***B03C 1/01*** | (2006.01) |
| ***B03C 1/28*** | (2006.01) |
| ***B03C 1/30*** | (2006.01) |
| ***B65G 47/80*** | (2006.01) |
| ***B82Y 20/00*** | (2011.01) |
| ***B82Y 30/00*** | (2011.01) |
| ***B82Y 40/00*** | (2011.01) |
| ***C08L 5/08*** | (2006.01) |
| ***C12M 1/34*** | (2006.01) |
| ***C12M 3/06*** | (2006.01) |
| ***C12N 1/14*** | (2026.01) |
| ***C12N 1/20*** | (2026.01) |
| ***C12Q 1/02*** | (2006.01) |
| ***C12Q 1/6806*** | (2018.01) |
| ***C12Q 1/6844*** | (2018.01) |
| ***C12Q 1/6848*** | (2018.01) |
| ***C12Q 1/6851*** | (2018.01) |
| ***C12Q 1/686*** | (2018.01) |
| ***G01K 1/14*** | (2021.01) |
| ***G01N 1/34*** | (2006.01) |
| ***G01N 1/44*** | (2006.01) |
| ***G01N 15/10*** | (2024.01) |
| ***G01N 15/14*** | (2024.01) |
| ***G01N 15/1433*** | (2024.01) |
| ***G01N 21/01*** | (2006.01) |
| ***G01N 21/03*** | (2006.01) |
| ***G01N 21/05*** | (2006.01) |
| ***G01N 21/29*** | (2006.01) |
| ***G01N 21/33*** | (2006.01) |
| ***G01N 21/35*** | (2014.01) |
| ***G01N 21/59*** | (2006.01) |
| ***G01N 21/65*** | (2006.01) |
| ***G01N 21/75*** | (2006.01) |
| ***G01N 21/77*** | (2006.01) |
| ***G01N 27/07*** | (2006.01) |
| ***G01N 27/28*** | (2006.01) |
| ***G01N 27/416*** | (2006.01) |
| ***G01N 30/02*** | (2006.01) |
| ***G01N 30/60*** | (2006.01) |
| ***G01N 30/72*** | (2006.01) |
| ***G01N 31/10*** | (2006.01) |
| ***G01N 31/12*** | (2006.01) |
| ***G01N 33/543*** | (2006.01) |
| ***G01N 33/557*** | (2006.01) |
| ***G01N 33/564*** | (2006.01) |
| ***G01N 33/574*** | (2006.01) |
| ***G01N 33/575*** | (2026.01) |
| ***G01N 33/57515*** | (2026.01) |
| ***G01N 33/58*** | (2006.01) |
| ***G01N 33/68*** | (2006.01) |
| ***G01N 33/72*** | (2006.01) |
| ***G01N 35/00*** | (2006.01) |
| ***G01N 35/02*** | (2006.01) |
| ***H05B 45/10*** | (2020.01) |
| ***H10W 90/00*** | (2026.01) |

(58) Field of Classification Search
CPC ...... G01N 35/0098; B03C 1/01; B03C 1/288; B03C 1/30; B03C 2201/18; B03C 2201/26
See application file for complete search history.

(56) References Cited

U.S. PATENT DOCUMENTS

| | | | | |
|---|---|---|---|---|
| 10,775,397 | B2 | 9/2020 | Tajima | |
| 11,332,704 | B2 | 5/2022 | Tajima et al. | |
| 2009/0311733 | A1* | 12/2009 | Korpela | G01N 1/40 435/252.1 |
| 2015/0309059 | A1 | 10/2015 | Tajima | |
| 2016/0137967 | A1* | 5/2016 | Tajima | C12M 41/14 435/173.9 |
| 2019/0039034 | A1 | 2/2019 | Siow et al. | |
| 2019/0113528 | A1 | 4/2019 | Hashimoto et al. | |
| 2022/0017890 | A1 | 1/2022 | Lee | |
| 2022/0119752 | A1 | 4/2022 | Tajima | |

FOREIGN PATENT DOCUMENTS

| | | | |
|---|---|---|---|
| EP | 0965842 | A1 | 12/1999 |
| JP | 2009192232 | A * | 8/2009 |
| JP | 2015-19632 | A | 2/2015 |
| JP | 6680873 | B2 | 4/2020 |
| JP | 2020-528754 | A | 10/2020 |
| WO | 97/44671 | A1 | 11/1997 |
| WO | 2014/077400 | A1 | 5/2014 |
| WO | 2015/005299 | A1 | 1/2015 |
| WO | 2017/195778 | A1 | 11/2017 |
| WO | 2019027561 | A2 | 2/2019 |
| WO | 2019027561 | A3 | 3/2019 |
| WO | 2020/093824 | A1 | 5/2020 |
| WO | 2020/162431 | A1 | 8/2020 |

* cited by examiner (a)

(b)

(a)

(b)

(c)

(a)

(b)

(a)

(b)

(a)

(b)

(a)

(b)

BIO-RELATED SUBSTANCE EXTRACTING DEVICE AND PROCESSING SYSTEM

TECHNICAL FIELD

The present invention relates to a bio-related substance extracting device and a processing system and more particularly to a bio-related substance extracting device and a processing system that use magnetic particles and a magnetic body and thereby separate bio-related substances containing a substance such as a specific glycan.

BACKGROUND ART

Whole blood contains a transferrin derived from a liver and a transferrin derived from a brain, and those have different glycan structures and are thus capable of being identified and separated. It has been known that in early Alzheimer's dementia, a transferrin which is derived from the brain (cerebrospinal fluid) and has a specific glycan is produced. Accordingly, in Patent Literature 1, Hashimoto et al. suggest that a transferrin having a specific glycan be used as a marker for early Alzheimer's dementia.

On the other hand, as for extraction of a bio-related substance, the inventor of the present application has suggested a method and a device in Patent Literature 2. The method and device execute extraction of a bio-related substance by using magnetic particles which adsorb a bio-related substance (a nucleic acid), a dispensing tip which retains a solution containing the magnetic particles, and an external magnet which is movable relative to the dispensing tip.

CITATION LIST

Patent Literature

Patent Literature 1: Japanese Patent No. 6680873 (WO 2017/195778)

Patent Literature 2: International Publication No. WO 97/44671 (EP 0965842 A1)

SUMMARY OF INVENTION

Technical Problem

Bio-related substances such as proteins (for example, transferrins) can be extracted from a sample such as whole blood by using a method and a device in Patent Literature 2. However, the bio-related substances such as proteins which are extracted in such a manner contain bio-related substances which are bonded to different glycans.

Glycans or the like which are bonded to bio-related substances are capable of being bonded to antibodies (such as lectins), but affinity between the glycans or the like and the antibodies are comparatively weak. When a comparatively intense process like drawing and discharge of a solution from and to a dispensing tip is performed, because bonds between the glycans or the like and the antibodies are destroyed, it has been difficult for the method and the device in Patent Literature 2 to separate a bio-related substance containing a specific glycan or the like from the bio-related substances containing different glycans or the like.

Accordingly, an object of the present invention is to provide an extracting device and a processing system that are capable of extracting a bio-related substance containing a substance such as a specific glycan by a comparatively calm process.

Solution to Problem

Aspects of the present invention are configured as follows:

First Aspect

An extracting device extracting a bio-related substance from a sample by using magnetic particles, the extracting device including:

- a plurality of extraction vessels which retain a solution containing the magnetic particles and the sample and which are arranged in a first direction;
- one or more magnet bodies which exert a magnetic force on the plurality of extraction vessels;
- a magnet moving mechanism which moves the one or more magnet bodies between a contact position in which the one or more magnet bodies are in contact with the one or more extraction vessels and a non-contact position in which the one or more magnet bodies are not in contact with the one or more extraction vessels;
- an oscillating mechanism which oscillates the plurality of extraction vessels and the magnet moving mechanism; and
- a control unit which controls actions of the oscillating mechanism and the one or more magnet moving mechanisms.

Second Aspect

The extracting device described in the first aspect, including

- a nozzle unit which has a plurality of dispensing nozzles arranged in the first direction and a nozzle moving mechanism moving the plurality of dispensing nozzles in a second direction different from the first direction, in which
- the oscillating mechanism includes an oscillating shaft which extends in the first direction,
- each of the plurality of extraction vessels includes a vessel main body storing a solution and a lid body covering the vessel main body, and
- the lid body includes a circular dispensing opening or a long and narrow dispensing opening which extends in the second direction.

Third Aspect

The extracting device described in the second aspect, in which

- the vessel main body includes an inclined flat surface portion which is inclined relative to the second direction.

Fourth Aspect

The extracting device described in the third aspect, in which

- the vessel main body includes a lowest portion which is connected to a lower end of the inclined flat surface portion.

Fifth Aspect

The extracting device described in the fourth aspect, in which a periphery of the lowest portion is inclined toward the lowest portion.

Sixth Aspect

The extracting device described in the fourth or fifth aspect, in which the lowest portion is formed in a position which is shifted from a center of the extraction vessel in the second direction.

Seventh Aspect

The extracting device described in any one of the third to sixth aspects, in which the magnet moving mechanism moves the one or more magnet bodies relative to an outer surface of the inclined flat surface portion.

Eighth Aspect

The extracting device described in the first aspect, in which the extraction vessel includes, on one side surface, a waste liquid tube and a waste liquid valve which adjusts a flow of a liquid passing through the waste liquid tube and includes, on another side surface, a collecting tube and a collecting valve which adjusts a flow of a liquid passing through the collecting tube.

Ninth Aspect

The extracting device described in the first or second aspect, in which the extracting device includes a vessel main body and the vessel main body includes a flat bottom surface and an inclined side surface which is connected to the flat bottom surface.

Tenth Aspect

The extracting device described in any one of the first and eighth to ninth aspects, including a temperature adjustment unit moving mechanism which moves the one or more temperature adjustment units between a contact position in which the one or more temperature adjustment units are in contact with the one or more extraction vessels and a non-contact position in which the one or more temperature adjustment units are not in contact with the one or more extraction vessels, in which the control unit controls actions of the one or more temperature adjustment units.

Eleventh Aspect

The extracting device described in any one of the first to tenth aspects, in which the temperature adjustment unit is configured with a heater or a Peltier device and a heat conduction portion which is arranged between the heater or the Peltier device and the vessel main body.

Twelfth Aspect

The extracting device described in any one of the first to ninth aspects, including an oscillating body which is oscillated by the oscillating mechanism, in which the oscillating body includes the plurality of extraction vessels, the one or more magnet bodies, the magnet moving mechanism, and the temperature adjustment unit.

Thirteenth Aspect

The extracting device described in any one of the first to twelfth aspects, in which the control unit oscillates the oscillating body in a state where at least the magnetic body is set in the contact position or the non-contact position.

Fourteenth Aspect

The extracting device described in any one of the first to thirteenth aspects, in which the control unit oscillates the extraction vessel at an inclination speed in a speed range of 0.8°/s to 1.2°/s by controlling the oscillating mechanism.

Fifteenth Aspect

The extracting device described in the fourteenth aspect, in which the control unit oscillates the extraction vessel in inclination angles in an angle range of ±15° to ±25° by controlling the oscillating mechanism.

Sixteenth Aspect

The extracting device described in the fifteenth aspect, in which the control unit controls the oscillating mechanism such that the oscillating mechanism repeats one oscillating action, which is configured with the speed range and the angle range, a plurality of times.

Seventeenth Aspect

The extracting device according to any one of the first to sixteenth aspect, including one or more temperature adjustment units which adjust a temperature of the one or more extraction vessels.

Eighteenth Aspect

A processing system processing the bio-related substance, the processing system including:

the extracting device described in any one of the first to seventeenth aspects;

the plurality of extraction vessels which are arranged in the first direction;

a plurality of dispensing nozzles which are arranged in the first direction; and a plurality of cartridges which retain various kinds of reagents and/or solutions to be used for an extracting process, in which the plurality of cartridges are arranged in a second direction which is different from the first direction.

Nineteenth Aspect

The processing system described in the eighteenth aspect, including a nozzle unit which supports the plurality of dispensing nozzles such that the plurality of dispensing nozzles are movable in the second direction.

Twentieth Aspect

The processing system described in the eighteenth or nineteenth aspect, including a measurement unit which measures each of a plurality of bio-related substances extracted in the plurality of extraction vessels.

Advantageous Effects of Invention

A bio-related substance extracting device and a processing system of the present invention can extract a bio-related substance to which a specific bonding substance is bonded without destroying a bonding structure between a bonding substance with comparatively weak affinity and a bio-related substance by using an oscillating mechanism.

DESCRIPTION OF EMBODIMENTS

Figure 1:
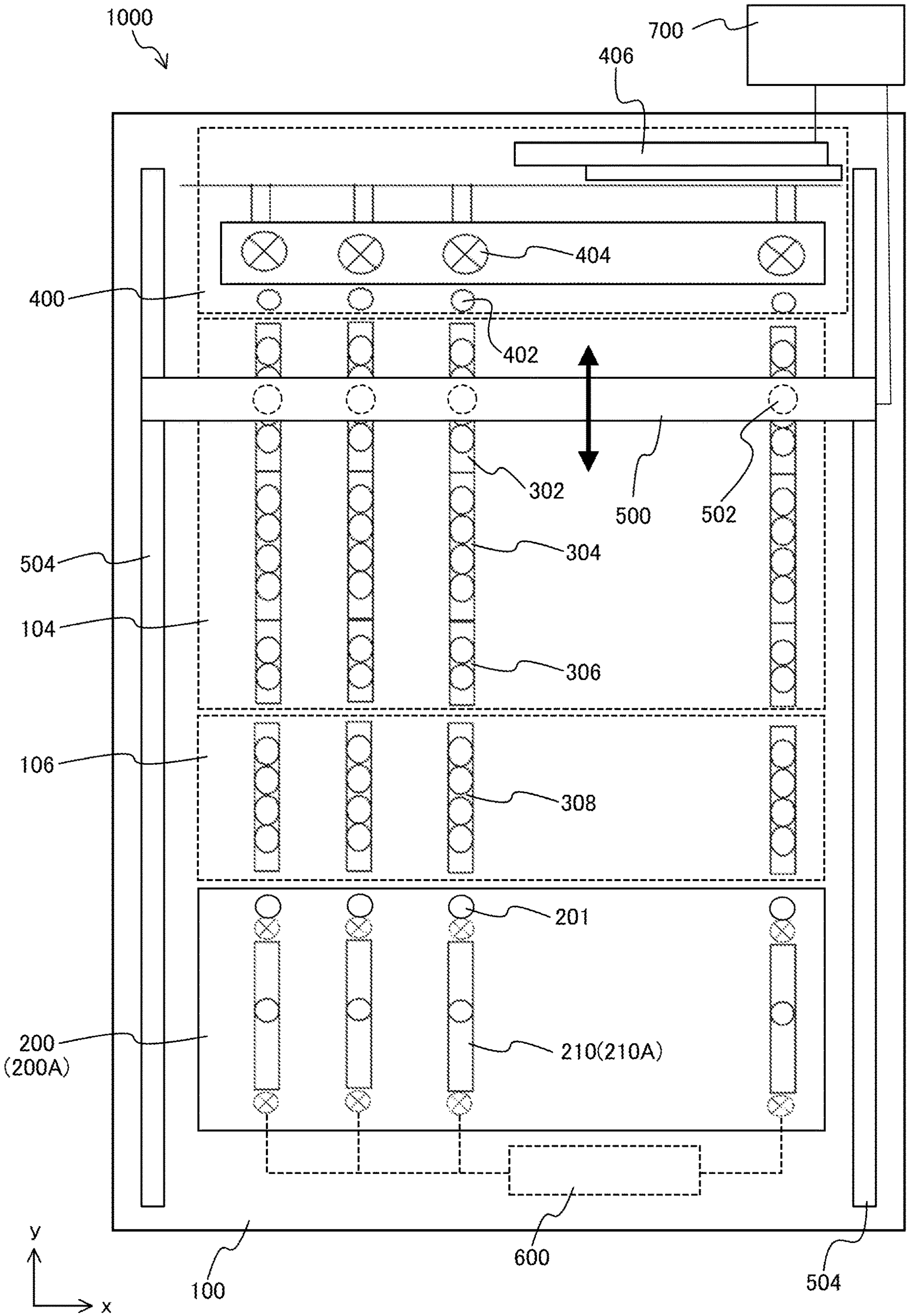
FIG. 1 is a top view illustrating a bio-related substance extracting system according to an embodiment of the present invention.

Embodiments according to a bio-related substance extracting device and a processing system of the present invention will be described with reference to drawings. Note that in the drawings, the same reference characters will be given to the same components, and descriptions thereof will appropriately be skipped. In FIGS. 1A to 22, relative sizes and/or arrangement of components are basically accurately illustrated, but the present invention is not limited to those.

In the embodiments of the present invention, a bio-related substance extracted from a sample is set as a transferrin bonded to a specific glycan, but this is not restrictive, and the bio-related substance may be set as any component included in a cell, an exosome, or any glycoprotein. Note that an x direction and a y direction in the present embodiment respectively correspond to a first direction and a second direction in the claims. Further, a first extraction liquid (transferrins derived from a liver and a brain) of the present embodiment corresponds to a sample in the claims, and a second extraction liquid (a transferrin derived from the brain) of the present embodiment corresponds to a bio-related substance in the claims.

Outline

A bio-related substance extracting device and a processing system according to the embodiments of the present invention extract the first extraction liquid (transferrins derived from the liver and the brain) from a sample such as whole blood by using a method of Patent Literature 2 and extract or separate a second extraction liquid (a transferrin derived from the brain) in a comparatively calm condition (calm and predetermined oscillating condition) from the first extraction liquid.

Basic Configuration of Processing System

Figure 1A:
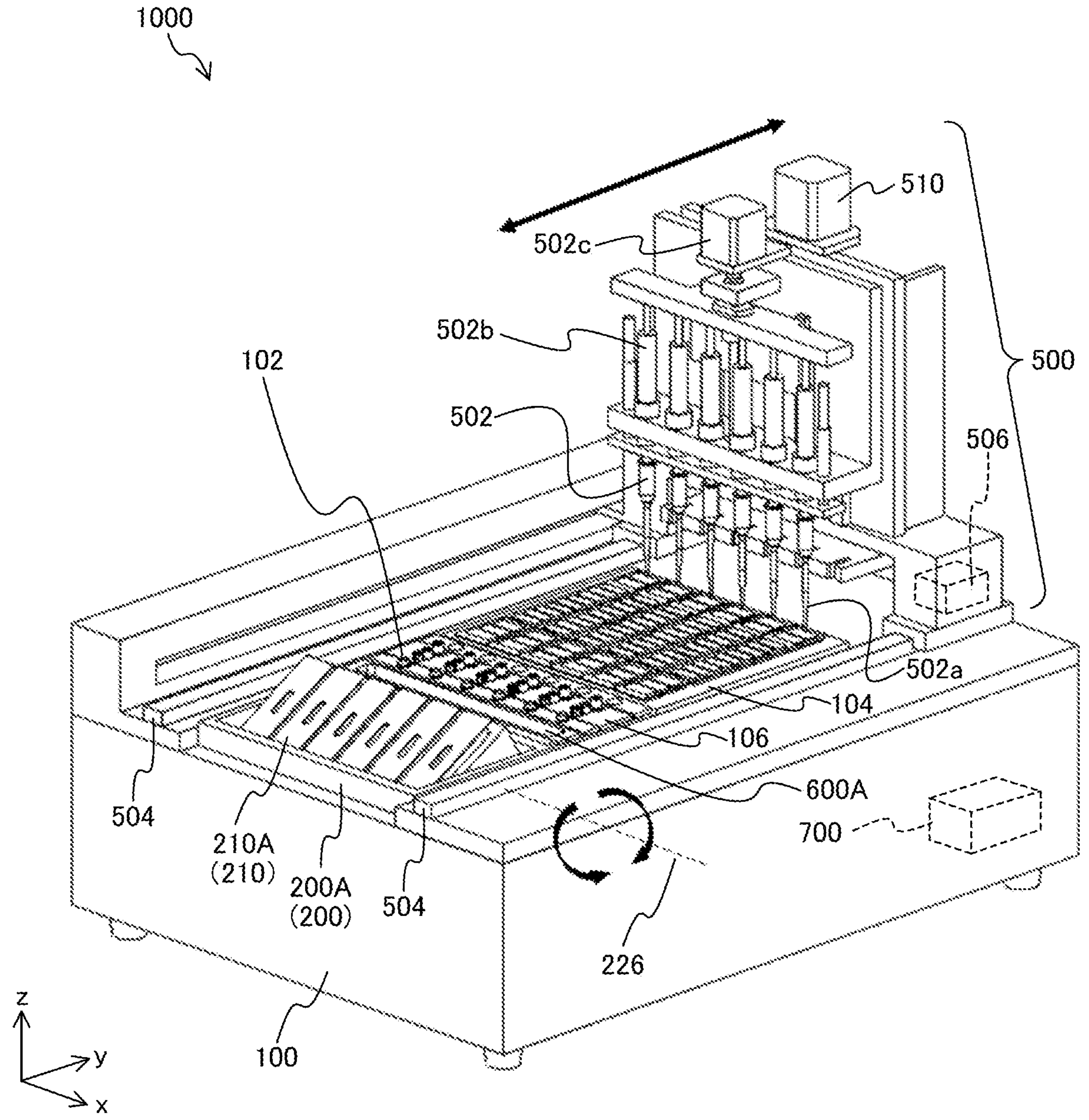
FIG. 1A is a perspective view illustrating the extracting system in FIG. 1.
Figure 16:
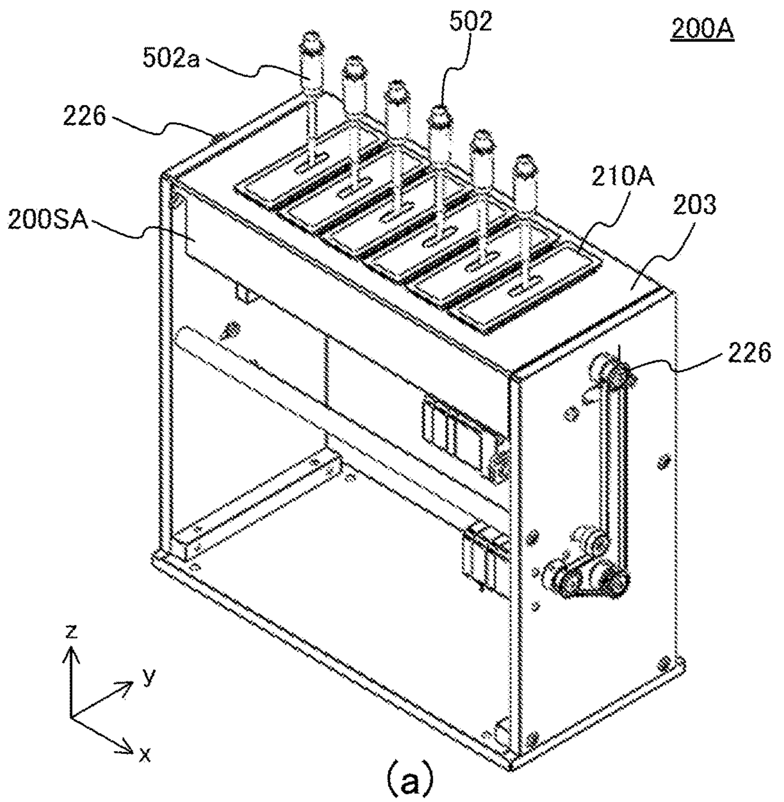
FIG. 16 illustrates an oscillating body according to a second embodiment, in which FIG. 16(*a*) is an upper perspective view in a partially exploded state and FIG. 16(*b*) is an upper perspective view in an assembled state.
Figure 16:
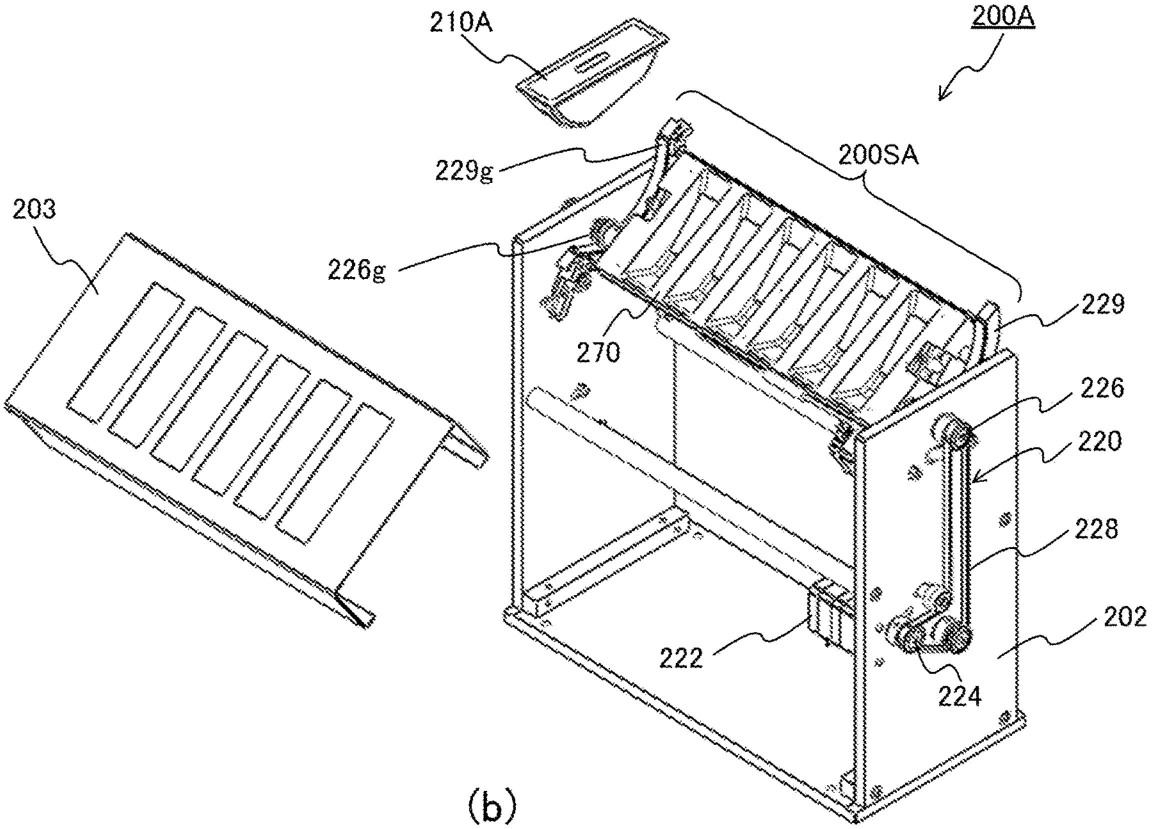
Figure 17:
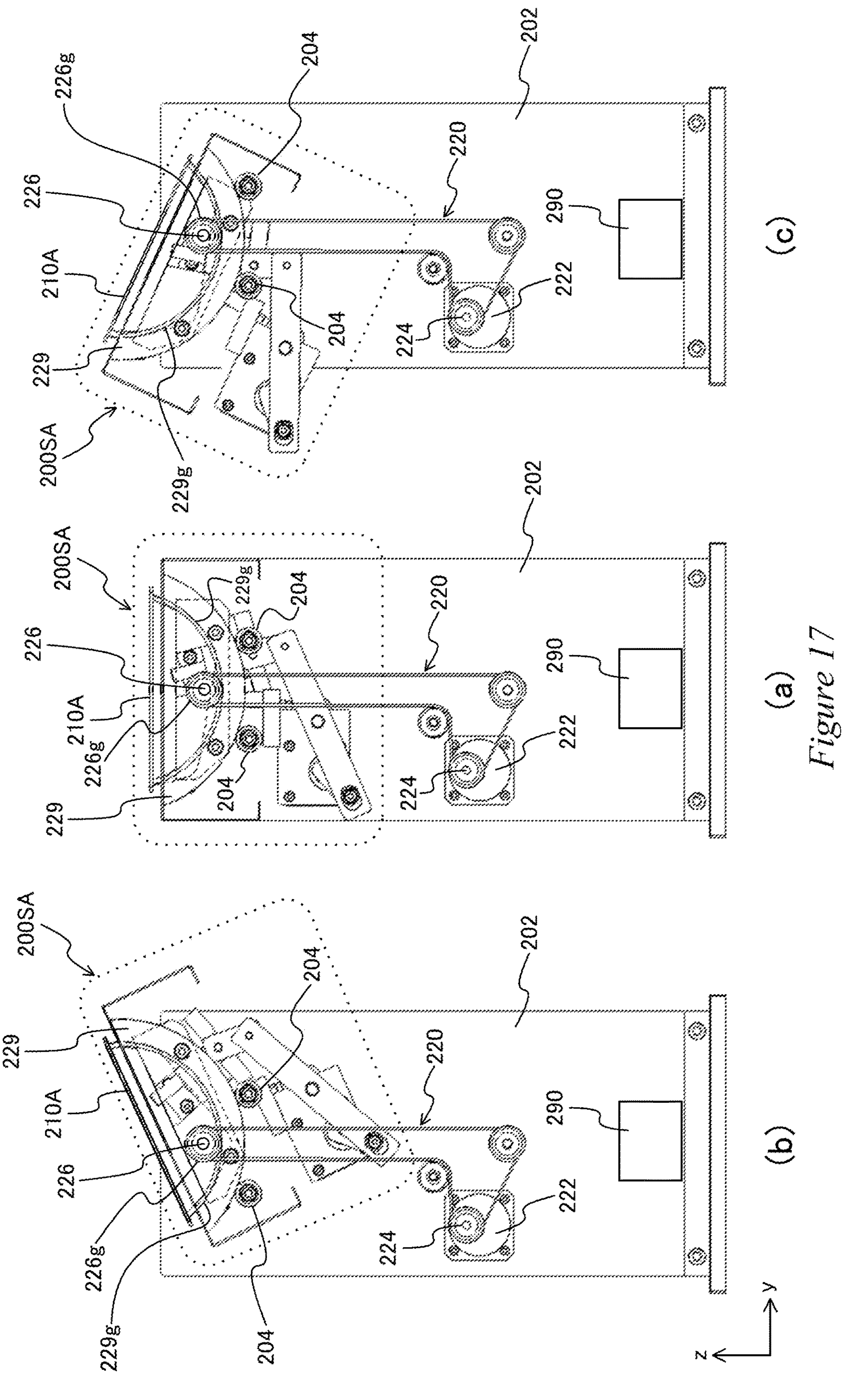
FIG. 17 is a side view illustrating an oscillating mechanism of the oscillating body in FIG. 16.

A basic configuration of a processing system 1000 according to first and second embodiments of the present invention will be described by using FIGS. 1 and 1A. As illustrated in FIGS. 1 and 1A, the processing system 1000 includes a base portion 100 which supports each portion. The base portion 100 is provided with an oscillating type bio-related substance extracting device 200 (200A), a cartridge retaining unit 104, a consumable retaining unit 106, and a measurement unit 400. The processing system 1000 according to the first embodiment includes the extracting device 200 (FIG. 4) and an oscillating body 200S (FIG. 5 and FIG. 8), and the processing system 1000 according to the second embodiment includes the extracting device 200A (FIG. 16) and an oscillating body 200SA (FIG. 16 and FIG. 17).

The extracting device 200 (200A) includes, in its upper surface, a plurality of extraction vessels 210 (210A) which are capable of being oscillated. The cartridge retaining unit 104 includes a plurality of lanes which extend in the y direction and retains a plurality of cartridges (first, second, and third cartridges 302, 304, and 306) of different kinds in one line in each of the lanes. The first cartridge 302 accommodates magnetic beads (magnetic particles) to which a first antibody is fixed, the first antibody being specifically bonded to a protein such as a transferrin TR, various kinds of solutions, and various kinds of reagents. The second cartridge 304 accommodates a second antibody to which a chemiluminescent substance or a fluorescent substance is fixed and which is specifically bonded to a protein such as a transferrin TR, various kinds of solutions, various kinds of reagents, and so forth. The third cartridge 306 accommodates lectin-fixing magnetic beads LMB (magnetic particles) to which a substance (lectin L) is fixed, the substance (lectin L) being bonded to a glycan G of a transferrin, various kinds of solutions, various kinds of reagents such as a chemiluminescent reagent or a fluorescent reagent, and so forth. The consumable retaining unit 106 retains consumables. As the consumables, a dispensing tip 502*a* (FIG. 4, FIG. 11, FIG. 16, FIG. 22, and so forth) and/or a punching tool for punching an aluminum seal of the cartridge, and so forth are raised.

The measurement unit 400 includes a plurality of measurement wells 402 which accommodate the second extraction liquid, a plurality of light receiving units 404 which receive light from the plurality of measurement wells 402, and a measurement device (photomultiplier tube) 406 which measures light from the plurality of light receiving units 404 via optical fibers. As the light from the measurement wells 402, chemiluminescence, fluorescence, or the like can be used. The measurement well 402 is preferably formed of a black material for blocking light.

The processing system 1000 includes a nozzle unit 500 which is movable in the y direction above an upper surface of the base portion 100, a waste liquid tank 600 provided in the base portion 100, and a control unit (computer) 700 which controls actions of units. An opening 600A (FIG. 1A) of the waste liquid tank 600 can be provided in the upper surface of the base portion 100. The nozzle unit 500 includes a plurality of dispensing nozzles 502 which are arranged in one line in the x direction while corresponding to a plurality of lanes, rails 504 which support a nozzle unit 500 having the plurality of dispensing nozzles 502 such that the nozzle unit 5002 are movable in the y direction, and a nozzle moving mechanism (moving motor) 506 which moves the nozzle unit 500. The control unit 700 controls actions of a nozzle moving mechanism 506 which moves the nozzle unit 500 in the y direction, of a piston motor 502*c* which drives drawing-discharging pistons 502*b* of the plurality of dispensing nozzles 502, and of an elevating-lowering motor 510 which elevates and lowers the plurality of dispensing nozzles 502.

First Embodiment

[Extraction Vessel of Bio-Related Substance]

Figure 2:
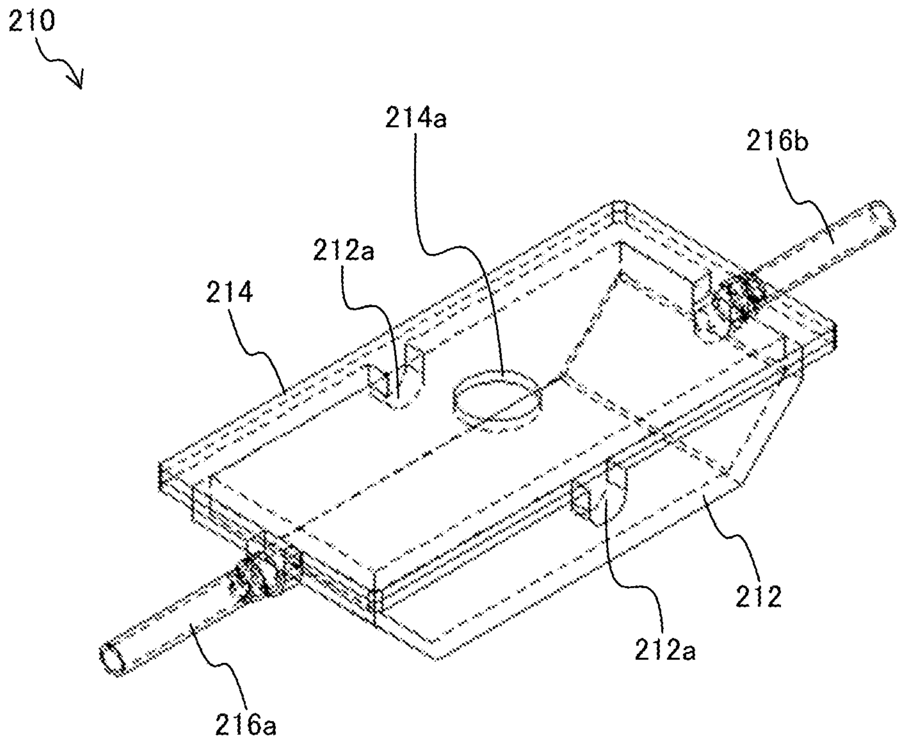
FIG. 2 is a perspective view illustrating extraction vessels according to a first embodiment.
Figure 2:
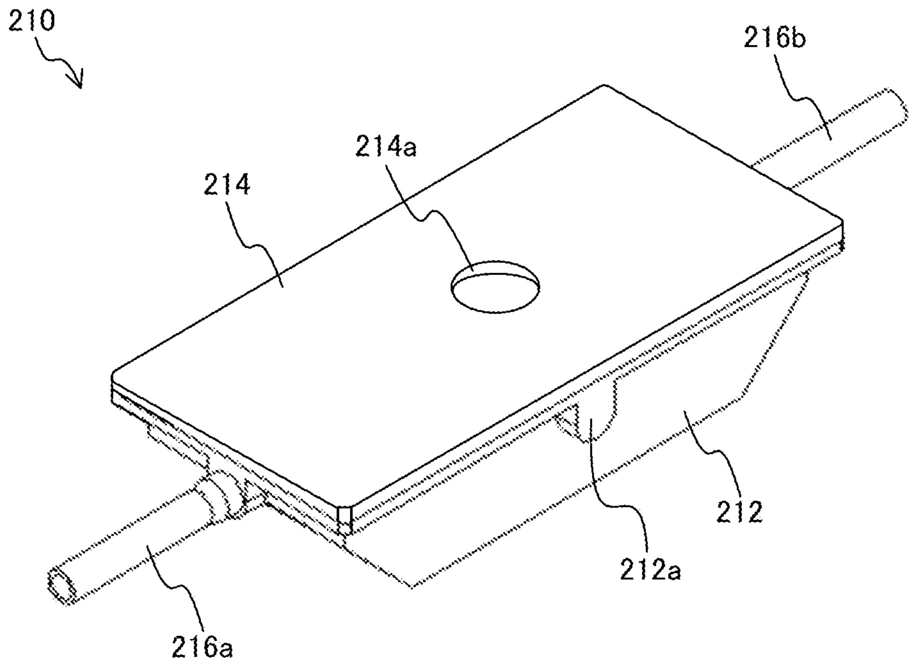
Figure 3:
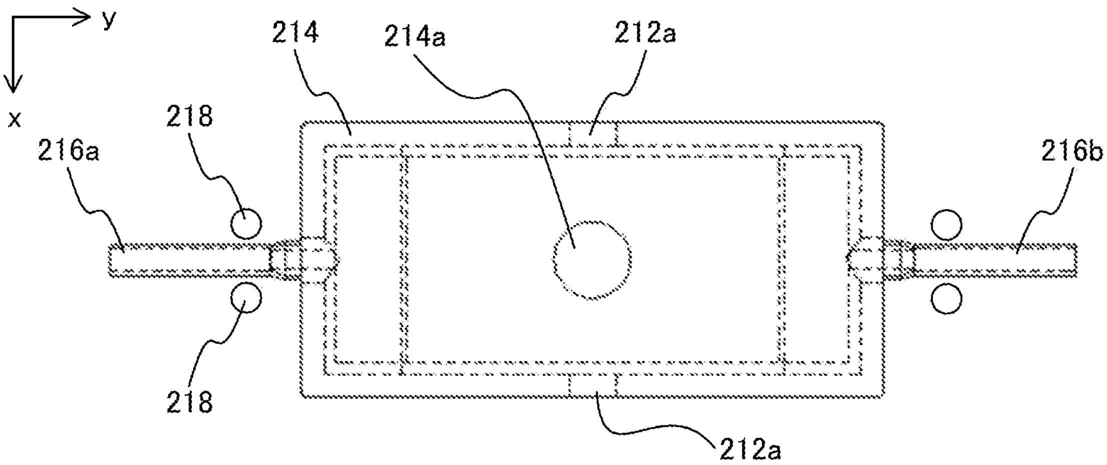
FIG. 3 illustrates the extraction vessel in FIG. 2, in which FIG. 3(*a*) is a top view of a valve-open state, FIG. 3(*b*) is a top view of a valve-closed state, and FIG. 3(*c*) is a side view.
Figure 3:
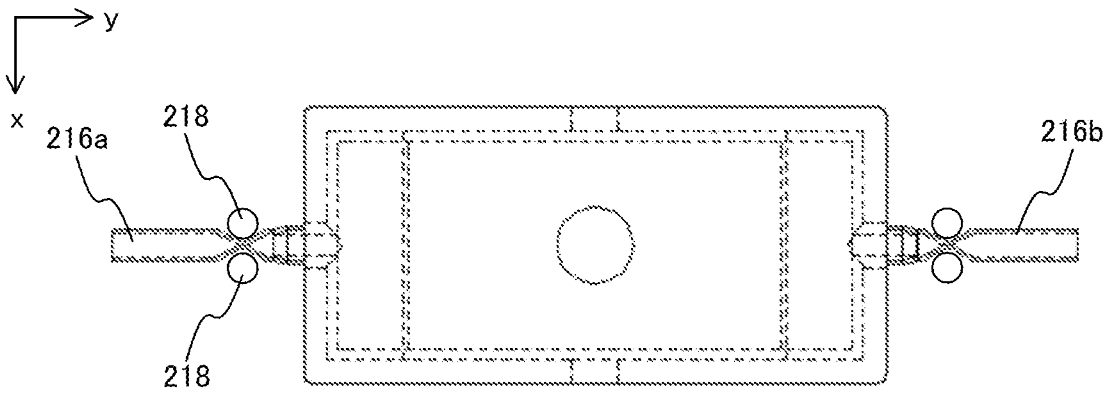
Figure 3:
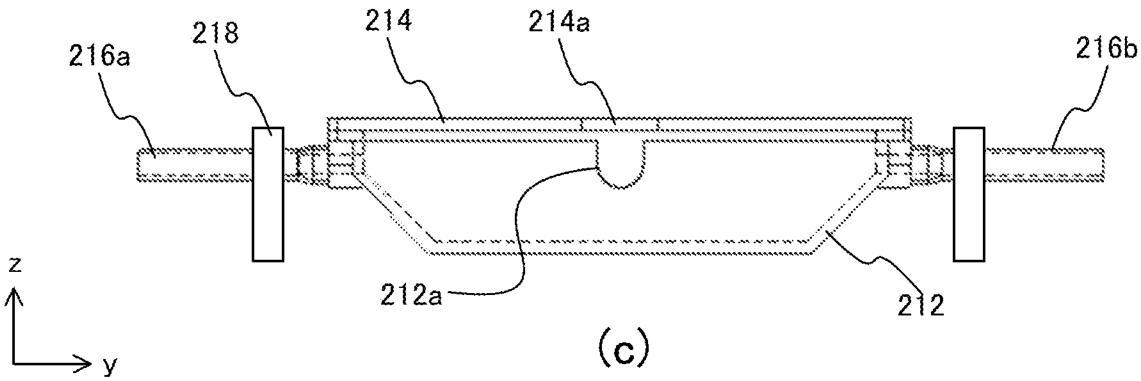

An extraction vessel 210 provided in the extracting device 200 according to the first embodiment will be described by using FIGS. 2 and 3. The extraction vessel 210 is configured with a vessel main body 212 which accommodates the first extraction liquid dispensed from the dispensing tip 502*a* of the dispensing nozzle 502, a lid body 214 which is fixed to an upper surface of the vessel main body 212, a flexible waste liquid tube 216*a* which is provided on one narrow-width side surface of the vessel main body 212, and a flexible collecting tube 216 which is provided on another narrow-width side surface of the vessel main body 212. Note that tube paths of the flexible waste liquid tube 216*a* and collecting tube 216*b* have sufficient length so as to enable oscillation and rotation of the vessel as described later.

The vessel main body 212 includes a flat bottom surface, and one pair of narrow-width side surfaces (inclined side surfaces) are connected to the flat bottom surface while being inclined relative to the flat bottom surface. Positioning projections 212*a* are formed in one pair of wide-width side surfaces of the vessel main body 212. As described later, the positioning projection 212*a* is accommodated in and fixed to a positioning recess portion 266 provided on an oscillating stage 260 and positions the extraction vessel 210.

The lid body 214 is a rectangular plate, and a dispensing opening 214*a* is formed in its central portion (around an intersection of diagonal lines). Into the dispensing opening 214*a*, the first extraction liquid, various kinds of reagents, and/or various kinds of reagents are injected from a distal end of the dispensing tip 502*a* attached to the dispensing nozzle 502 described later.

Figure 4:
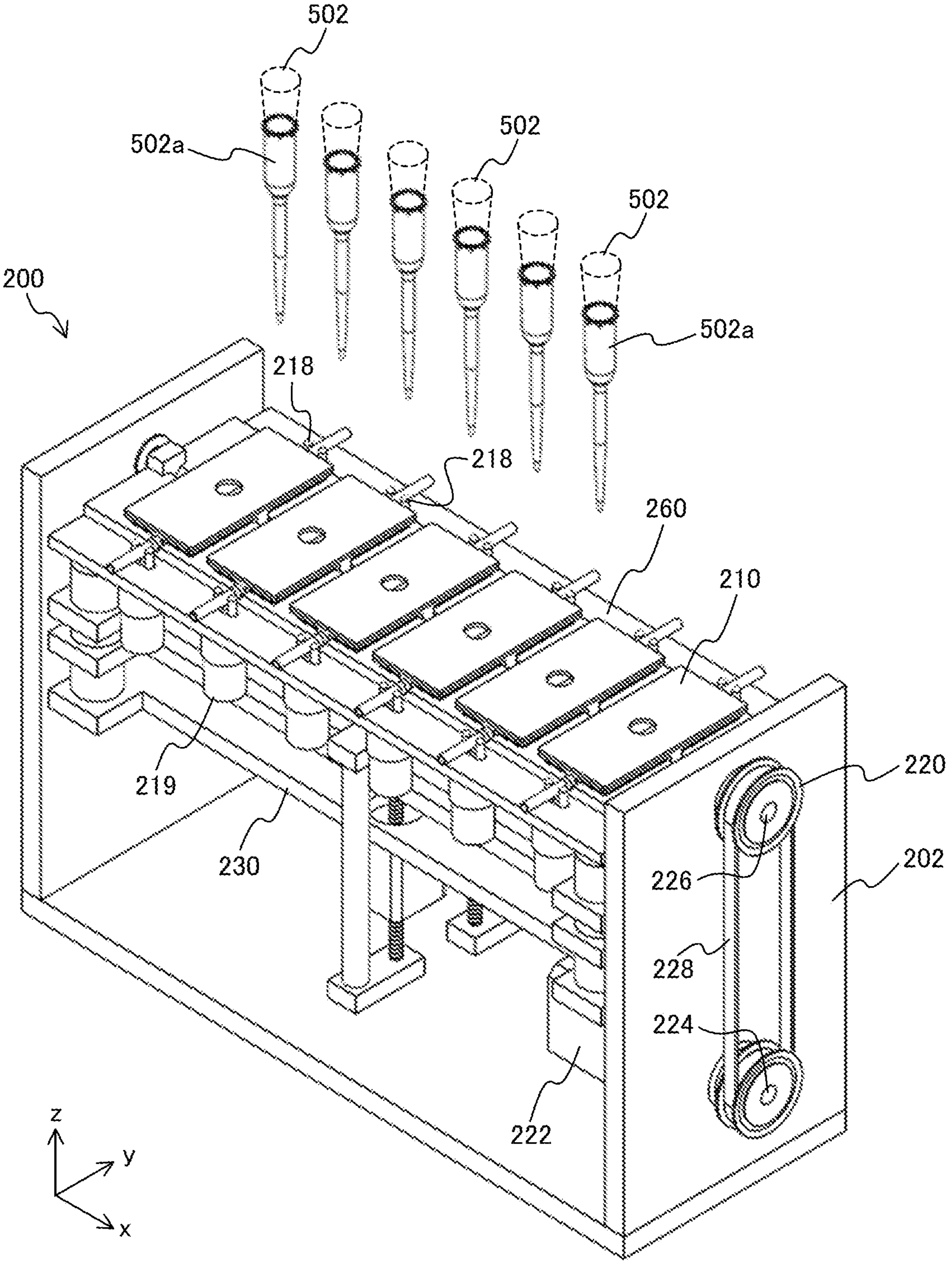
FIG. 4 is a perspective view illustrating an extracting device according to the first embodiment.

For each of the waste liquid tube 216*a* and the collecting tube 216*b*, one pair of nipping bodies 218 for nipping and occluding each of the tubes are provided. A waste-liquid-side pinch valve (waste-liquid-side pinch cock) is configured with the waste liquid tube 216*a* and the pair of nipping bodies 218. A collecting-side pinch valve (collecting-side pinch cock) is configured with the collecting tube 216*b* and the pair of nipping bodies 218. As illustrated in FIG. 4, a valve driving motor 219 is provided which drives the pair of nipping bodies 218. The valve driving motor 219 is controlled by the control unit 700.

[Extracting Device of Bio-related Substance]

The extracting device 200 according to the first embodiment will be described by using FIGS. 4 to 9. As illustrated in FIG. 4, the plurality of extraction vessels 210 are arranged in the x direction on the oscillating stage 260. The extracting device 200 includes an oscillating mechanism 220 which oscillates the plurality of extraction vessels 210 and a base portion (housing) 202 which supports the oscillating mechanism 220. The oscillating mechanism 220 is configured with an oscillating motor 222, a rotation shaft 224 of the oscillating motor 222, an oscillating shaft 226 which is connected to the plurality of extraction vessels 210, and a belt 228 which transmits rotation of the rotation shaft 224 to the oscillating shaft 226. The oscillating shaft 226 extends in the x direction and is connected to the oscillating stage 260 (oscillating body 200S) which accommodates and fixes each of the extraction vessels 210.

Figure 5:
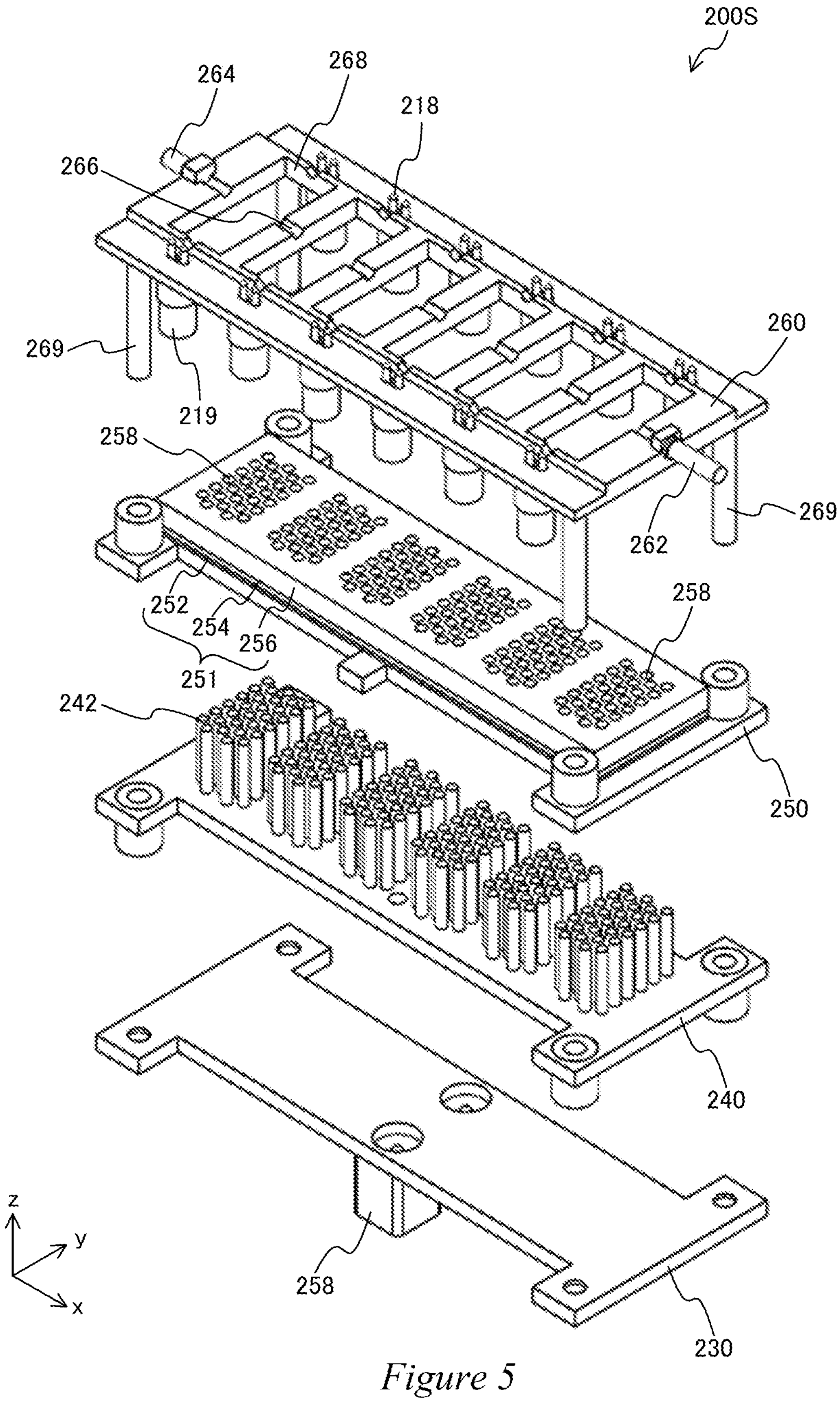
FIG. 5 is an exploded perspective view illustrating an oscillating body of the extracting device in FIG. 4.

FIG. 5 illustrates an exploded perspective view of the oscillating body (oscillating assembly) 200S of the extracting device 200. The oscillating body 200S is configured with a driving motor support portion 230, a magnet support plate 240 which is attached to the driving motor support portion 230 so as to be capable of being elevated and lowered (movable in a z direction) relative to the driving motor support portion 230, a temperature adjustment unit support plate 250 which is attached to the driving motor support portion 230 so as to be capable of being elevated and lowered (movable in the z direction) relative to the driving motor support portion 230, and the oscillating stage 260 which is fixed to the driving motor support portion 230 via a plurality of guide rods 269.

As illustrated in FIG. 5, the oscillating stage 260 has a plurality of accommodation openings 268 which each accommodate the plurality of extraction vessels 210, a first oscillating shaft 262 and a second oscillating shaft 264 for oscillating the oscillating stage 260, and a plurality of positioning recess portions 266 which accommodate the positioning projections 212*a* of the plurality of extraction vessels 210. A plurality of valve driving motors 219 are fixed to a lower surface of the oscillating stage 260. The accommodation opening of the oscillating stage accommodates each of the extraction vessels 210 in a state where a bottom surface of each of the extraction vessels 210 is exposed downward.

The plurality of guide rods 269 extend downward from corner portions of the oscillating stage 260. One end of the first oscillating shaft 262 is supported by bearings, which are formed in the base portion 202, to be capable of being oscillated and is oscillated integrally with the oscillating shaft 226. Another end of the first oscillating shaft 262 is fixed to the oscillating stage 260. One end of the second oscillating shaft 264 is supported by bearings, which are formed in the base portion 202, to be capable of being oscillated. Another end of the second oscillating shaft 264 is fixed to the oscillating stage 260.

The oscillating body 200S retains the magnet support plate 240 and/or a temperature adjustment unit support plate 250 between the driving motor support portion 230 and the oscillating stage 260 such that the magnet support plate 240 and/or the temperature adjustment unit support plate 250 are capable of being elevated or lowered (movable in the z direction) along the guide rods 269. Note that the temperature adjustment unit support plate 250 does not have to be capable of being elevated and lowered, and the temperature adjustment unit support plate 250 may be fixed to the guide rods 269.

The temperature adjustment unit support plate 250 includes a temperature adjustment unit 251. The temperature adjustment unit 251 has a plurality of through holes 258 which pass through the temperature adjustment unit 251 in the z direction. A heating (temperature adjustment) action of the temperature adjustment unit 251 is controlled by the control unit 700. The temperature adjustment unit 251 can be provided as a heater 254 or a Peltier device 254. The heater 254 is configured with a sheet-shaped or flat-plate-shaped heat insulating material 252 which is arranged on an upper side of the temperature adjustment unit support plate 250, a sheet-shaped or flat-plate shaped heater 254 which is arranged on an upper side of the heat insulating material 252, and a flat-plate-shaped heat conduction portion (heat conductive block) 256 which is arranged on an upper side of the heater 254.

The Peltier device 254 includes a lower-side heat absorption-dissipation surface (second heat absorption-dissipation surface) 252 and an upper-side heat absorption-dissipation surface (first heat absorption-dissipation surface) 256, and an action of heat absorption and heat dissipation is controlled by the control unit 700. In a case where the Peltier device is used as the temperature adjustment unit 251, the temperature adjustment unit support plate 250 can be provided with a plurality of heat dissipation openings or can be provided with a heat sink so as to promote heat absorption and dissipation from the lower-side heat absorption-dissipation surface 252.

The magnet support plate 240 includes a plurality of magnet columns 242 which extend in the z direction. A whole set of the plurality of magnet columns 242 can be referred to as magnet body. The plurality of magnet columns 242 are provided in positions matching the plurality of through holes 258 in the z direction. The plurality of magnet columns 242 are capable of being inserted in and pulled out from the plurality of through holes 258 in the z direction. The plurality of through holes 258 and the plurality of magnet columns 242 are preferably arranged in a matrix manner. When seen from the bottom surface of the extraction vessel 210, the plurality of magnet columns 242 are preferably arranged such that polarities of the neighboring magnet columns are inverted.

Figure 6:
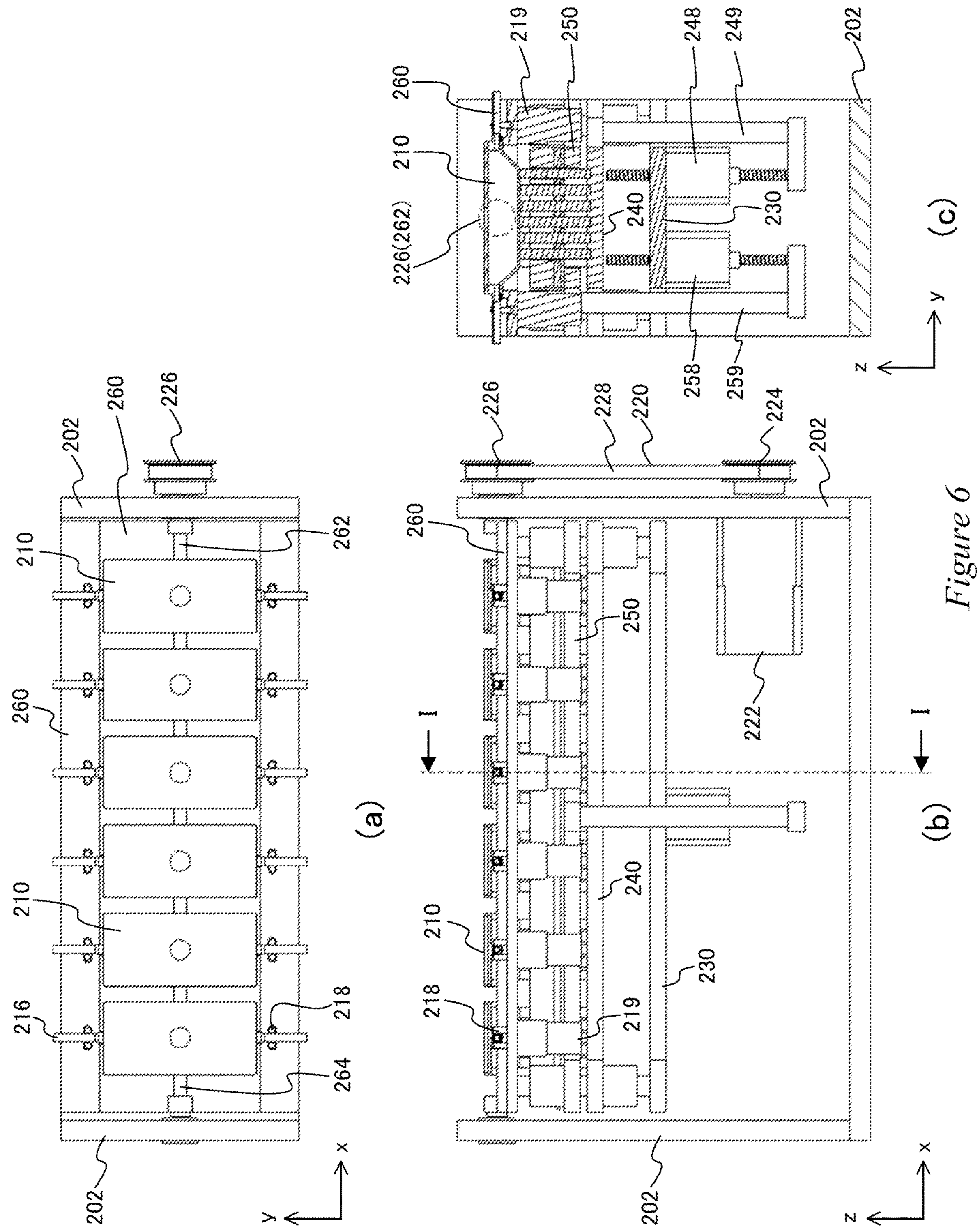
FIG. 6 illustrates the extracting device in FIG. 4, in which FIG. 6(*a*) is a top view, FIG. 6(*b*) is a front view, and FIG. 6(*c*) is a cross-sectional view in I-I direction.

As illustrated in FIG. 6(*c*), the driving motor support portion 230 supports a magnet elevating-lowering motor 248 for elevating and lowering the magnet support plate 240 and a temperature adjustment unit elevating-lowering motor 258 for elevating and lowering the temperature adjustment unit support plate 250. Actions of the magnet elevating-lowering motor 248 and of the temperature adjustment unit elevating-lowering motor 258 are controlled by the control unit 700.

A rotation shaft of the magnet elevating-lowering motor 248 is a screw shaft, a female screw portion at a lower end of a magnet elevating-lowering member 249 is attached to the screw shaft, and a ball screw mechanism is thereby formed. An upper end of the magnet elevating-lowering member 249 is fixed to the magnet support plate 240. Accordingly, in accordance with rotation of the rotation shaft of the magnet elevating-lowering motor 248, the magnet support plate 240 (a plurality of magnet columns 242) is elevated and lowered together with the magnet elevating-lowering member 249. A magnet moving mechanism is configured with the magnet elevating-lowering motor 248, the magnet elevating-lowering member 249, and the magnet support plate 240.

A rotation shaft of the temperature adjustment unit elevating-lowering motor 258 is a screw shaft, a female screw portion at a lower end of a temperature adjustment unit elevating-lowering member 259 is attached to the screw shaft, and a ball screw mechanism is thereby formed. An upper end of the temperature adjustment unit elevating-lowering member 259 is fixed to the temperature adjustment unit support plate 250. Accordingly, in accordance with rotation of the rotation shaft of the temperature adjustment unit elevating-lowering motor 258, the temperature adjustment unit support plate 250 (heater 254) is elevated and lowered together with the temperature adjustment unit elevating-lowering member 259. A temperature adjustment unit moving mechanism is configured with the temperature adjustment unit elevating-lowering motor 258, the temperature adjustment unit elevating-lowering member 259, and the temperature adjustment unit support plate 250. Note that without providing the temperature adjustment unit moving mechanism, the temperature adjustment unit 251 can fixedly be arranged in a state where the temperature adjustment unit 251 is in contact with the bottom surface of the extraction vessel 210.

Figure 7:
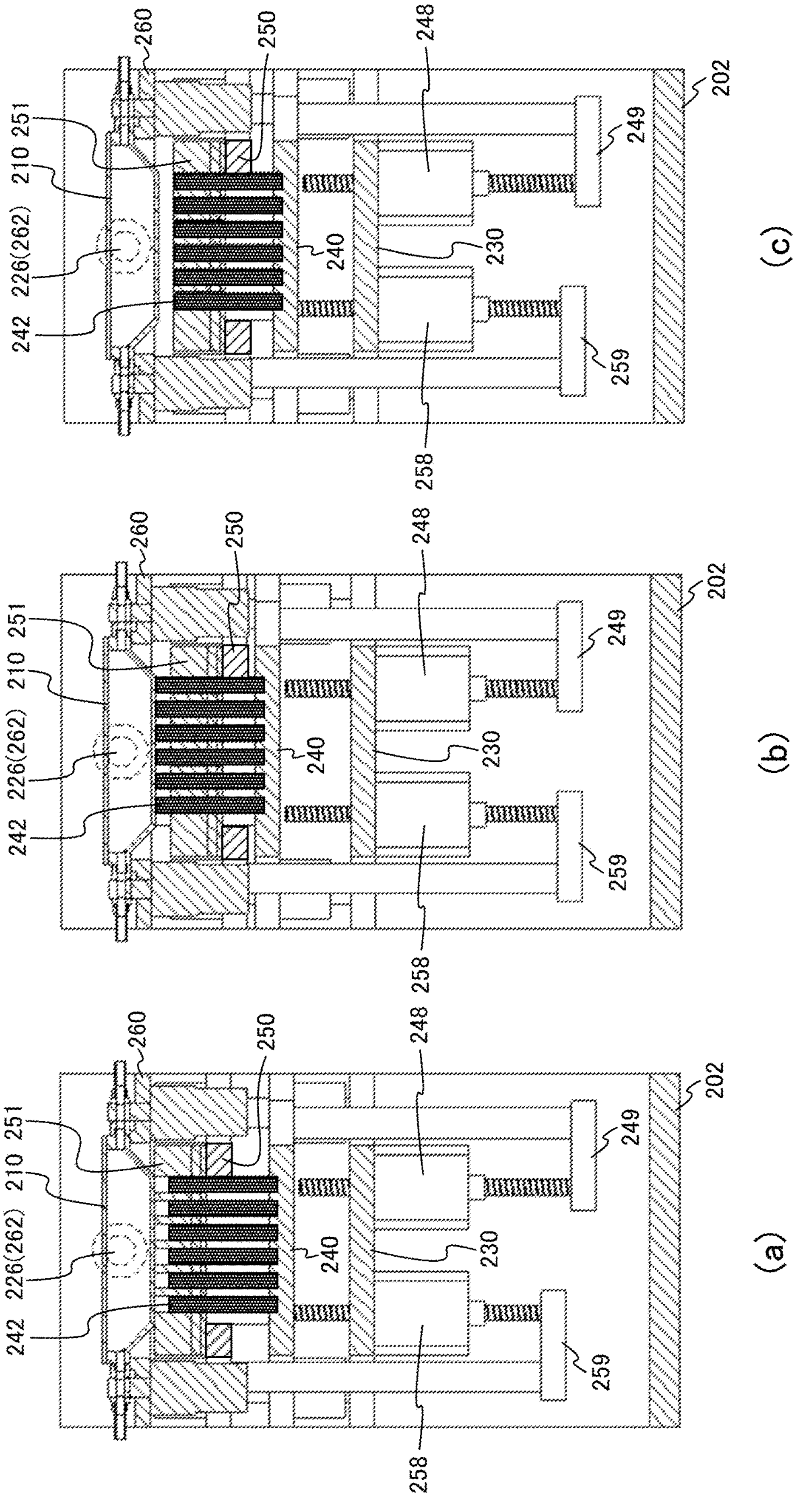
FIG. 7 is a cross-sectional view illustrating elevating-lowering states in the extracting device in FIG. 6(*c*).

A description will be made, by using FIG. 7, about an elevating-lowering state of the temperature adjustment unit 251 and an elevating-lowering state of the plurality of magnet columns 242. In FIG. 7(*a*), the plurality of magnet columns 242 are in a lowered position (non-contact position), and the temperature adjustment unit 251 is in an elevated position (contact position). In FIG. 7(*b*), the plurality of magnet columns 242 are in an elevated position, and the temperature adjustment unit 251 is in a lowered position. In FIG. 7(*c*), the plurality of magnet columns 242 and the temperature adjustment unit 251 are in the lowered positions.

As illustrated in FIG. 7(*a*) and FIG. 7(*c*), in a state where the plurality of magnet columns 242 are in the lowered position, upper ends of the plurality of magnet columns 242 are downward spaced apart from a bottom flat surface of the extraction vessel 210, and the plurality of magnet columns 242 do not exert a magnetic force on an internal portion of the extraction vessel 210. As illustrated in FIG. 7(*b*), in a state where the plurality of magnet columns 242 are in the elevated position, the upper ends of the plurality of magnet columns 242 are in contact with the bottom flat surface of the extraction vessel 210, and the plurality of magnet columns 242 exert the magnetic force on the internal portion of the extraction vessel 210.

As illustrated in FIG. 7(*a*), in a state where the temperature adjustment unit 251 is in the elevated position, an upper surface of the temperature adjustment unit 251 abuts the bottom flat surface of the extraction vessel 210, and the temperature adjustment unit 251 is capable of heating or cooling the extraction vessel 210. As illustrated in FIG. 7(*b*) and FIG. 7(*c*), in a state where the temperature adjustment unit 251 is in the lowered position, the upper surface of the temperature adjustment unit 251 is downward spaced apart from the bottom flat surface of the extraction vessel 210, and the temperature adjustment unit 251 does not heat or cool the extraction vessel 210.

In such a manner, because the plurality of magnet columns 242 (magnet support plate 240) and the temperature adjustment unit 251 (temperature adjustment unit support plate 250) are capable of being elevated and lowered independently from each other, the control unit 700 can quickly switch the following states (1) to (3).

(1) A state which is illustrated in FIG. 7(*a*) and where the extraction vessel 210 is heated or cooled and the magnetic force is not exerted on the extraction vessel 210.

(2) A state which is illustrated in FIG. 7(*b*) and where the magnetic force is exerted on the extraction vessel 210 and the extraction vessel 210 is not heated or cooled.

(3) A state which is illustrated in FIG. 7(*c*) and where the extraction vessel 210 is not heated or cooled and the magnetic force is not exerted on the extraction vessel 210.

(4) A state which is not illustrated and where the magnetic force is exerted on the extraction vessel 210 and the extraction vessel 210 is heated or cooled.

Figure 8:
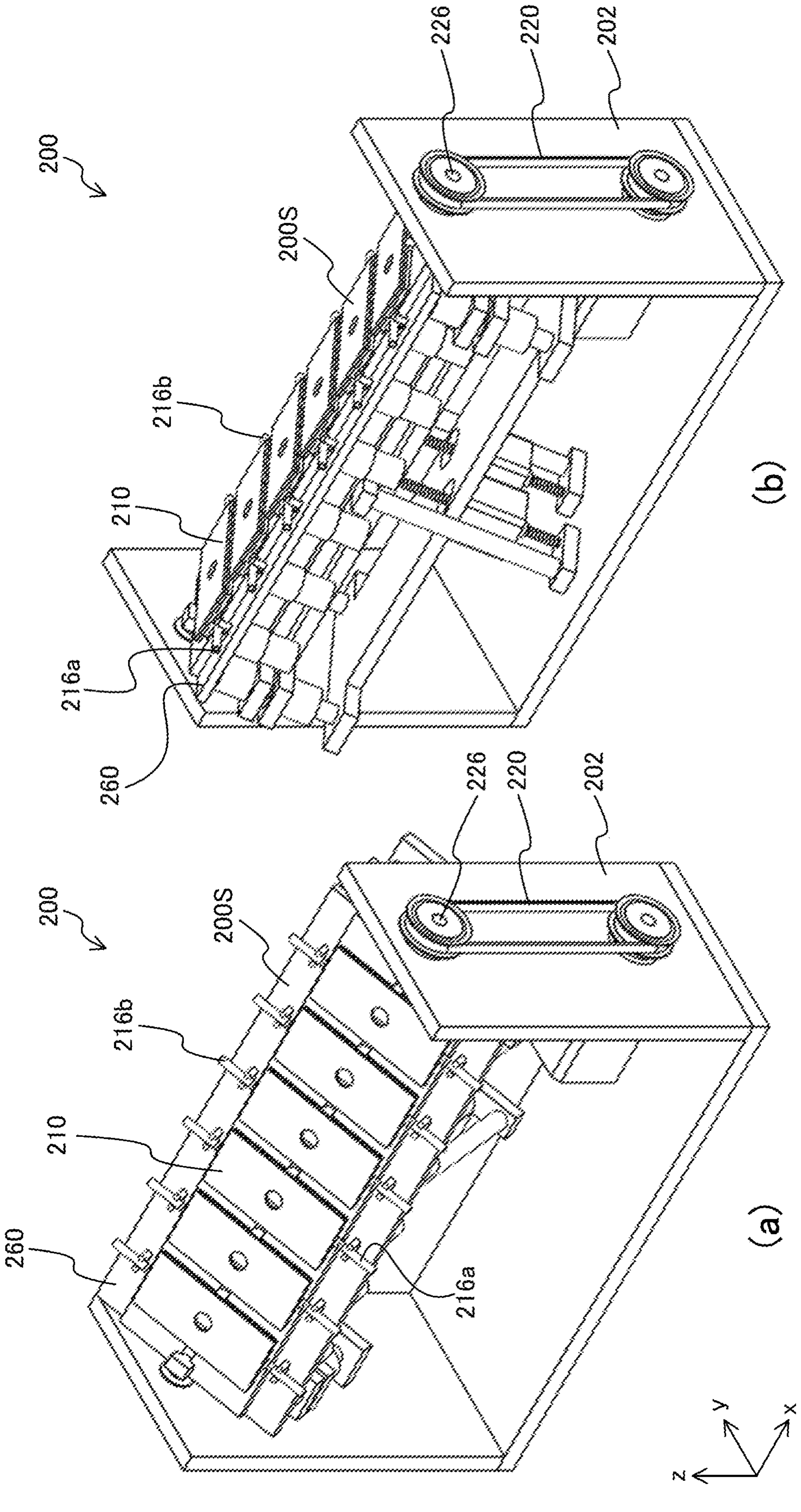
FIG. 8 is a perspective view illustrating an oscillating state of the extracting device in FIG. 4.

FIG. 8 illustrates an oscillating state of the oscillating body 200S. The oscillating body 200S performs oscillation between arrangement in FIG. 8(*a*) and FIG. 8(*b*) around the oscillating shaft 226 extending in the x direction by the oscillating mechanism 220. Further, FIG. 8(*a*) illustrates liquid wasting arrangement from the extraction vessel 210, and FIG. 8(*b*) illustrates collecting arrangement from the extraction vessel 210. In the liquid wasting arrangement in FIG. 8(*a*), the waste liquid tube 216*a* side of the extraction vessel 210 is positioned on a lower side, and when a valve 218 (a valve 218A or 218B which will be described later) is set to an open state, a liquid can be wasted from the extraction vessel 210. In the collecting arrangement in FIG. 8(*b*), the collecting tube 216*b* side of the extraction vessel 210 is positioned on the lower side, and when the valve 218 (the valve 218A or 218B which will be described later) is set to the open state, the second extraction liquid can be collected from the extraction vessel 210 by dropping and transporting the second extraction liquid to a second extraction liquid vessel 201 (FIG. 1).

[First Modification of Extraction Vessel]

Figure 9:
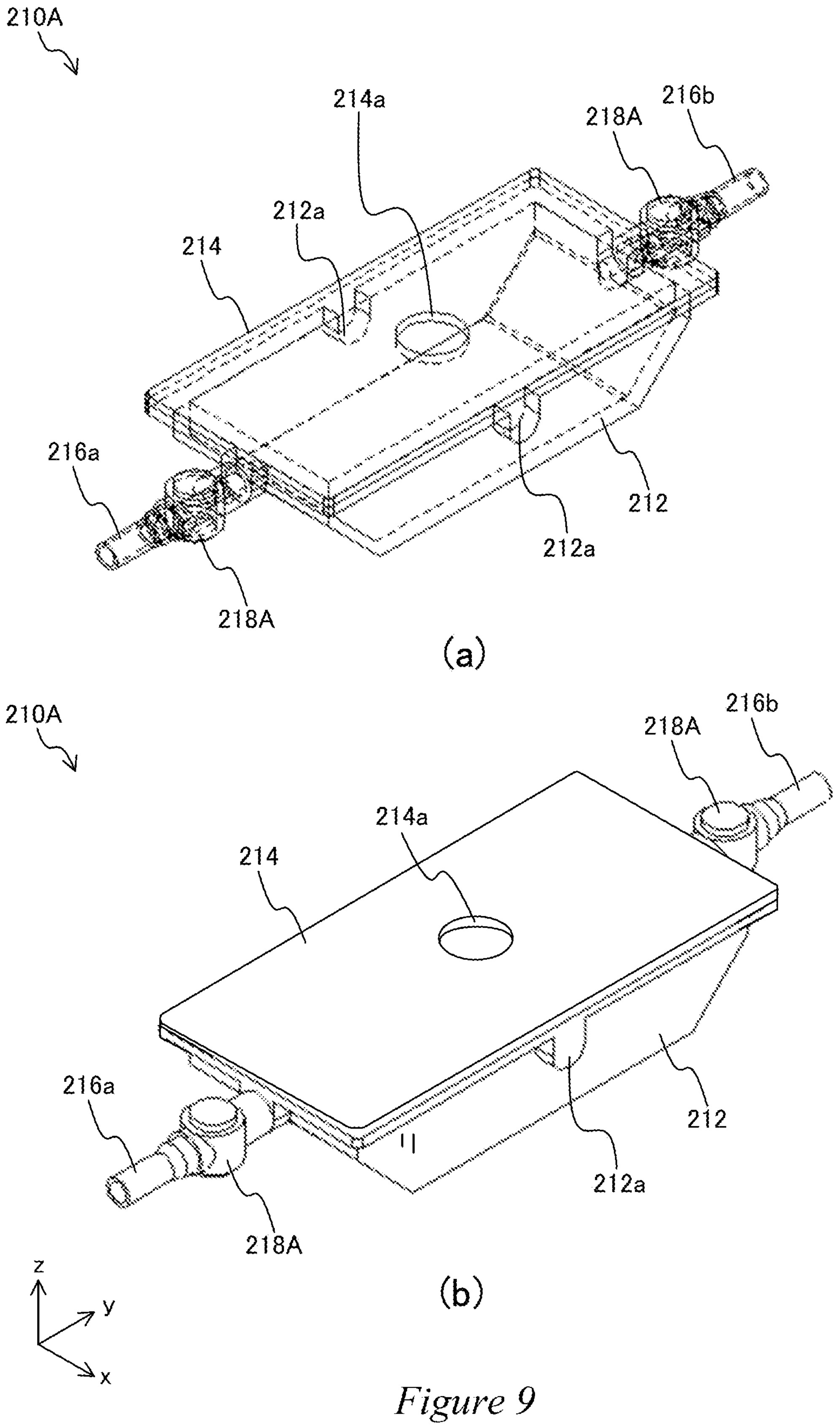
FIG. 9 is a perspective view illustrating a first modification of the extraction vessel.
Figure 10:
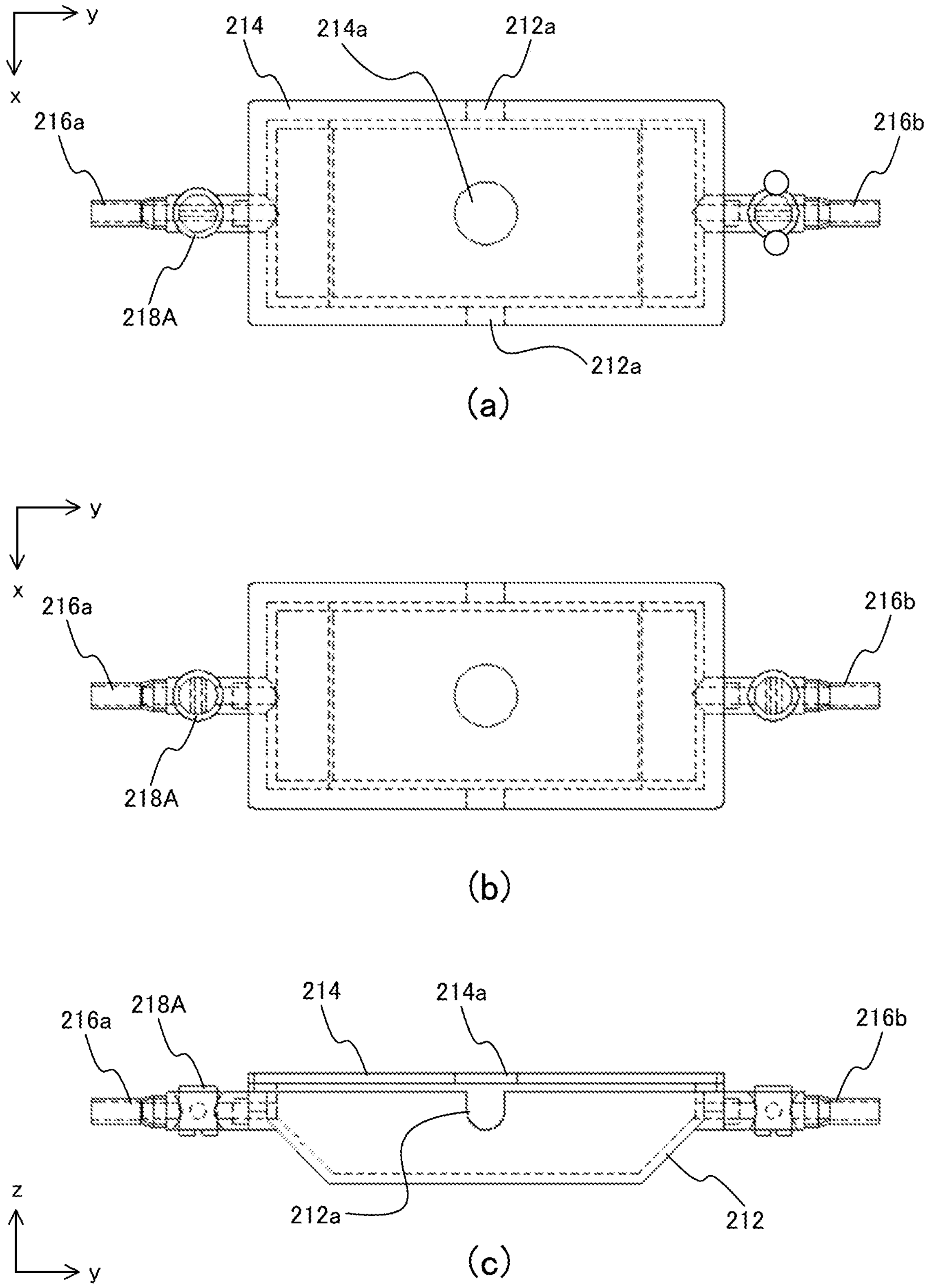
FIG. 10 illustrates the extraction vessel in FIG. 9, in which FIG. 10(*a*) is a top view of the valve-open state, FIG. 10(*b*) is a top view of the valve-closed state, and FIG. 10(*c*) is a side view.
Figure 11:
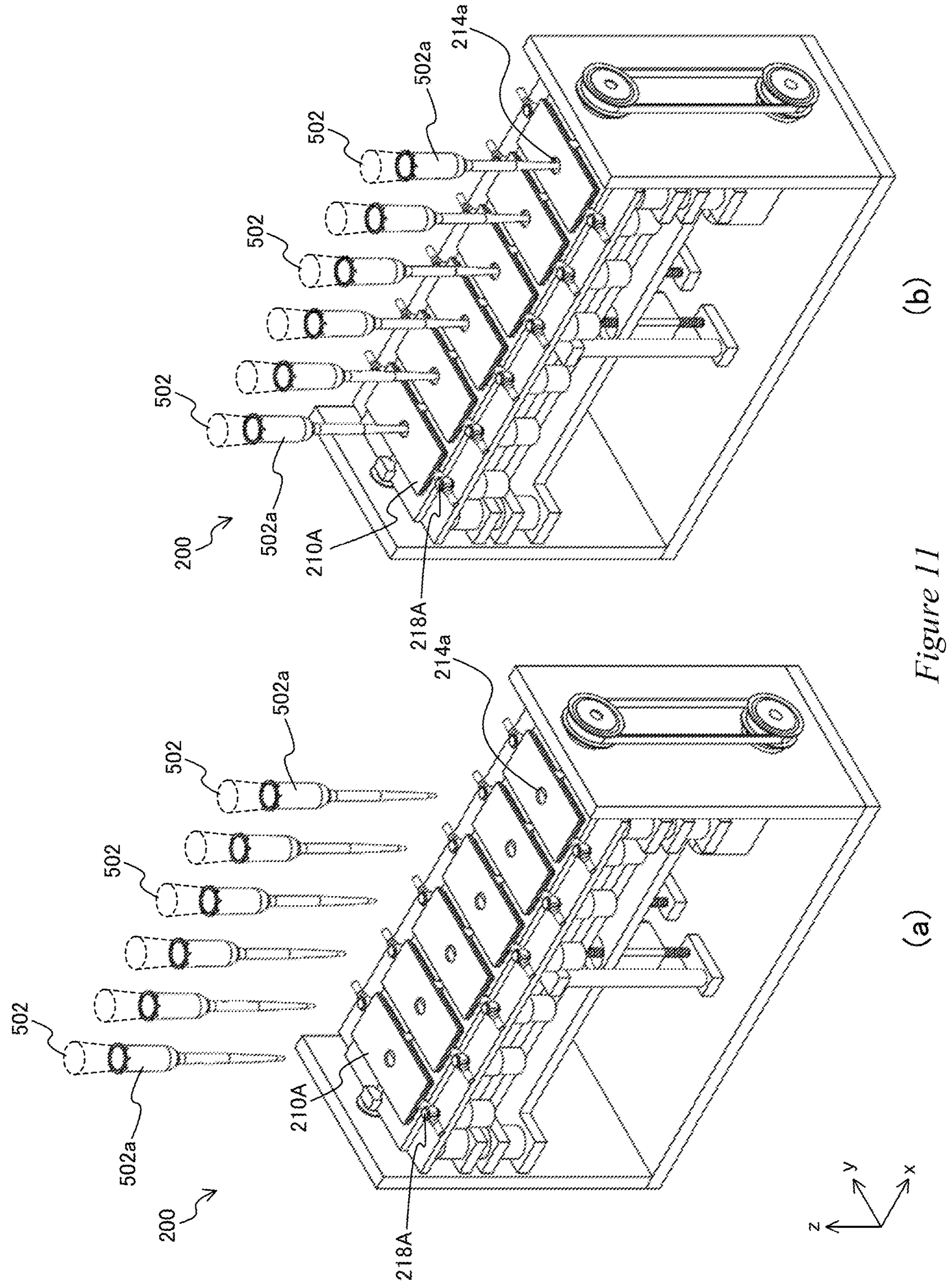
FIG. 11 is a perspective view of the extracting device including the extraction vessels in FIG. 9.

A first modification of the extraction vessel according to the first embodiment will be described by using FIGS. 9 to 11. Instead of pinch valves (pairs of nipping bodies) 218 of the extraction vessel 210 in FIG. 2, the extraction vessel 210A according to the first modification includes two-way valves 218A for the waste liquid tube 216*a* and the collecting tube 216*b*. The two-way valve 218A is opened and closed by the valve driving motor 219.

[Second Modification of Extraction Vessel]

Figure 12:
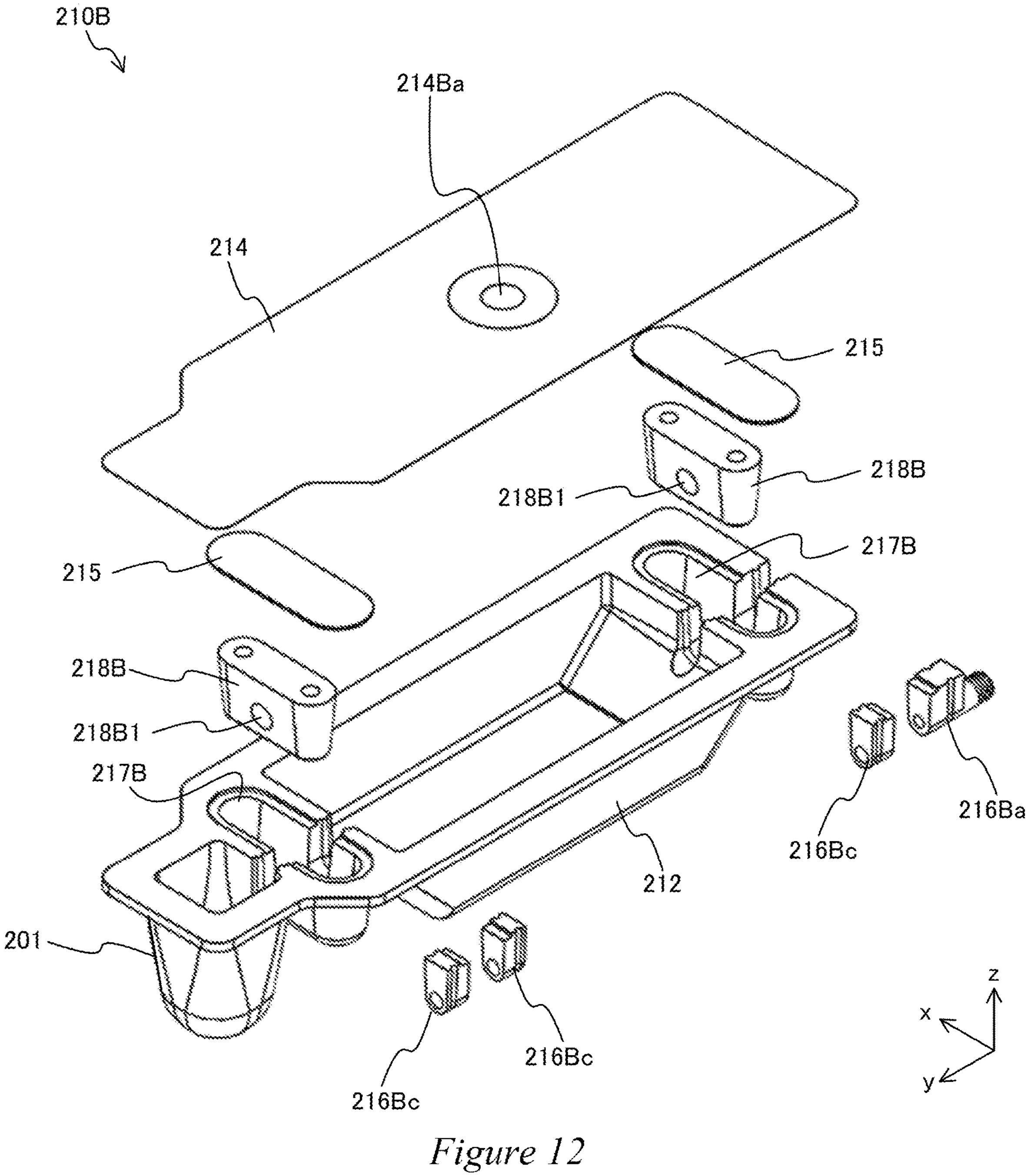
FIG. 12 is an exploded perspective view illustrating a second modification of the extraction vessel.
Figure 13:
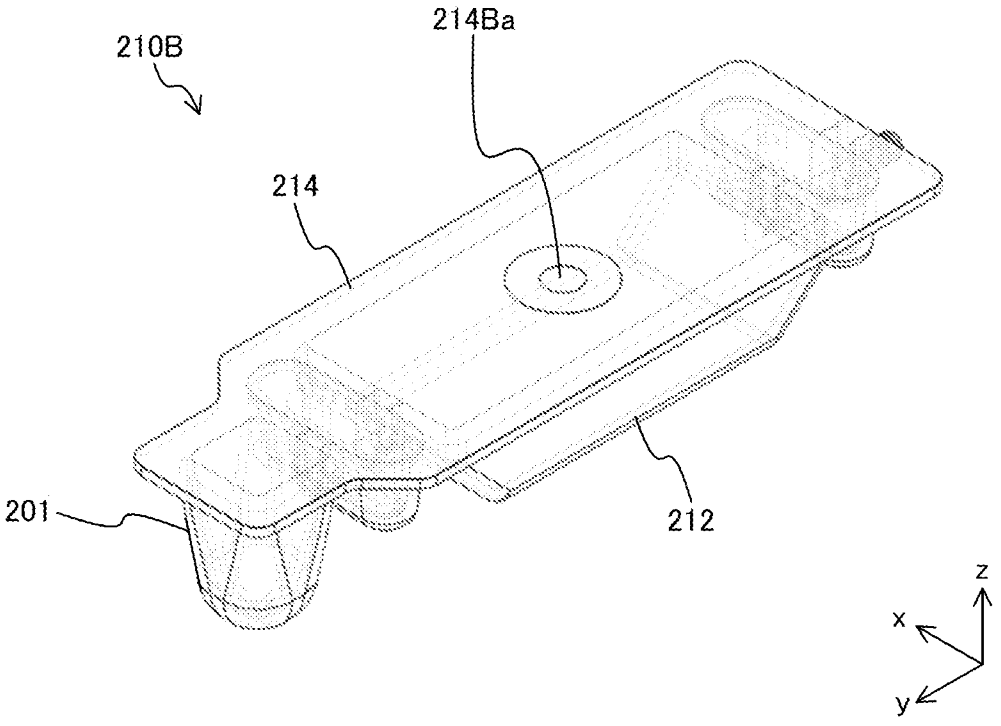
FIG. 13 illustrates the extraction vessel in FIG. 12, in which FIG. 13(*a*) is an upper perspective view and FIG. 13(*b*) is a lower perspective view.
Figure 13:
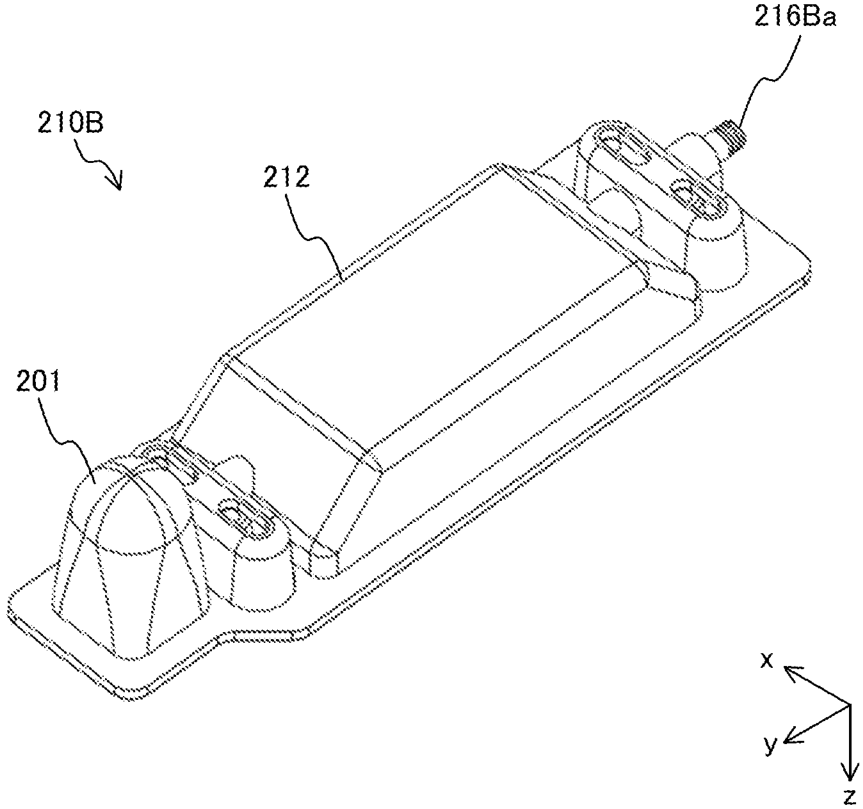
Figure 14:
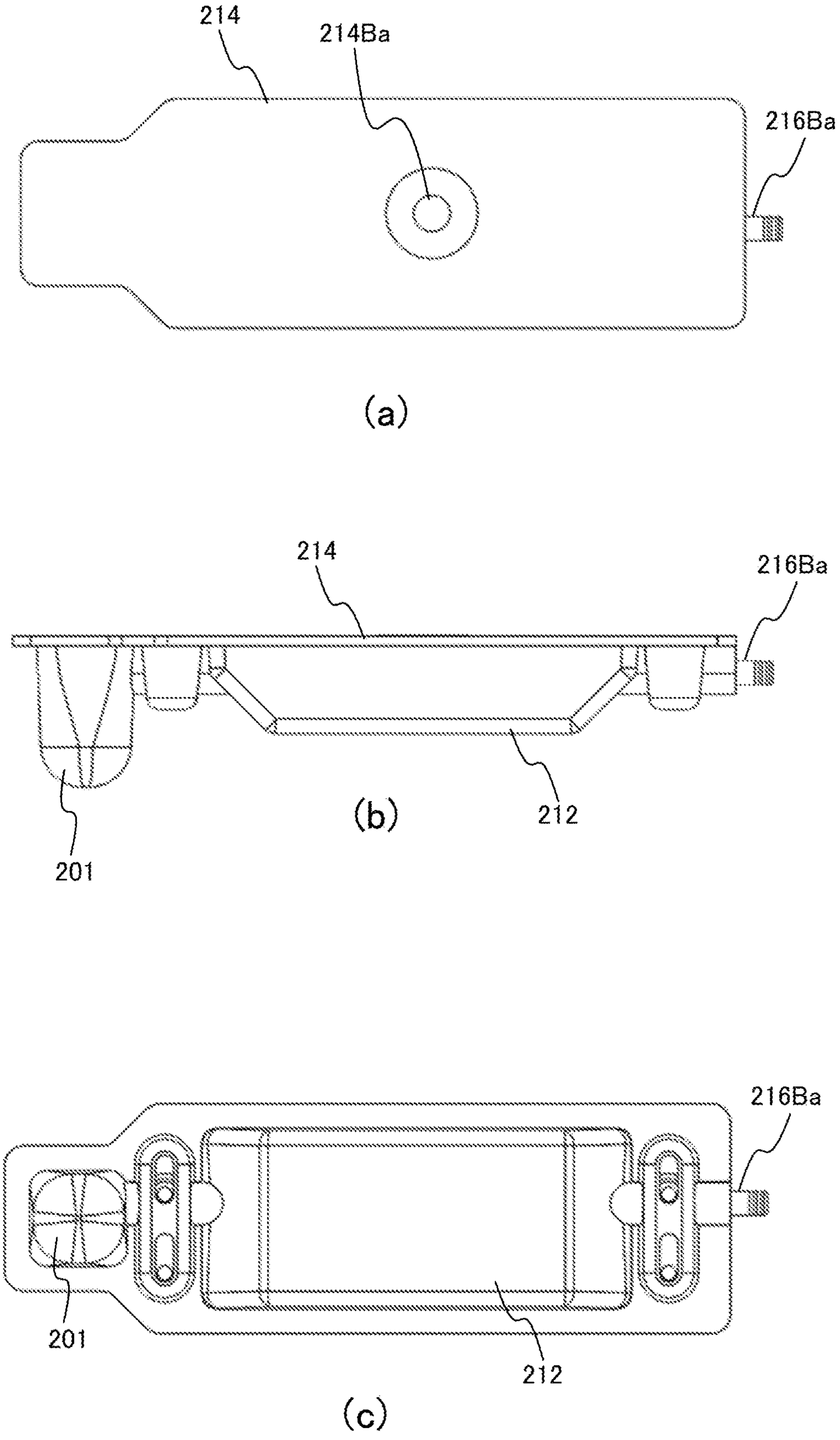
FIG. 14 illustrates the extraction vessel in FIG. 12, in which FIG. 14(*a*) is a top view, FIG. 14(*b*) is a side view, and FIG. 14(*c*) is a bottom view.

A second modification of the extraction vessel according to the first embodiment will be described by using FIGS. 12 to 14. Instead of the pinch valves (pairs of nipping bodies) 218 of the extraction vessel 210 in FIG. 2, an extraction vessel 210B according to the second modification includes slide valves 218B for a waste liquid tube path and a collecting tube path. The slide valve 218B slides in the x direction and thereby opens and closes the waste liquid tube path and the collecting tube path. A lamination (aluminum) seal (lid body) 214 is provided which covers an upper surface of an extraction vessel 210B, a punching target label 214Ba is formed around a center of the lamination seal 214, and a dispensing opening is formed by a punching tool.

The vessel main body 212 includes recess portions 217B which accommodate the slide valves 218B on a waste liquid side and a collecting side such that those are slidable in the x direction. The slide valve 218B includes a slide through hole 218B1 which passes through the slide valve 218B in the y direction. A seal member 216Bc is arranged between the vessel main body 212 and each of the recess portions 217B, and the seal member 216Bc includes a through hole which passes through the seal member 216Bc in the y direction. On the outside of the collecting-side recess portion 217B, the second extraction liquid vessel 201 is integrally shaped. The seal member 216Bc is arranged between the collecting-side recess portion 217B and the second extraction liquid vessel 201, and the seal member 216Bc includes the through hole which passes through the seal member 216Bc in the y direction. On the outside of the waste-liquid-side recess portion 217B, a joint 216Ba is arranged which includes a tube path extending in the y direction. An outside end of the joint 216Ba is connected to the flexible waste liquid tube 216*a*.

Figure 15:
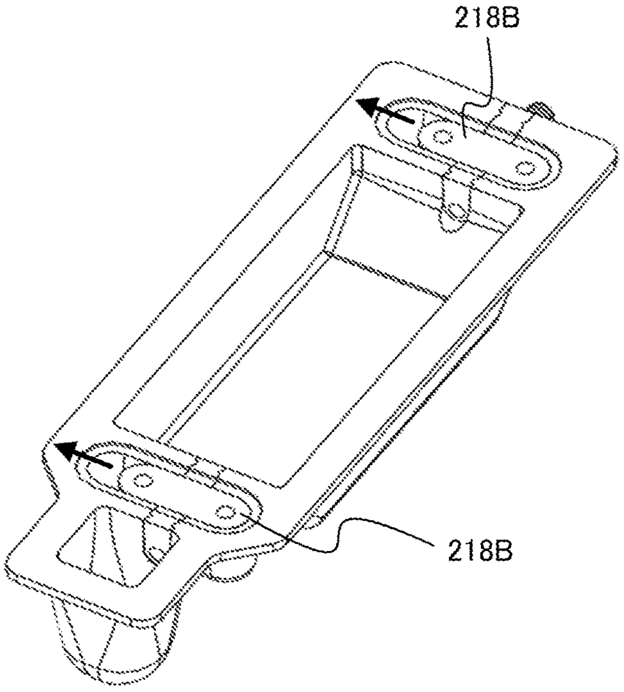
FIG. 15 illustrates an action of a slide valve in FIG. 12, in which FIG. 15(*a*) is an upper perspective view of an open state and FIG. 15(*b*) is an upper perspective view of a closed state.
Figure 15:
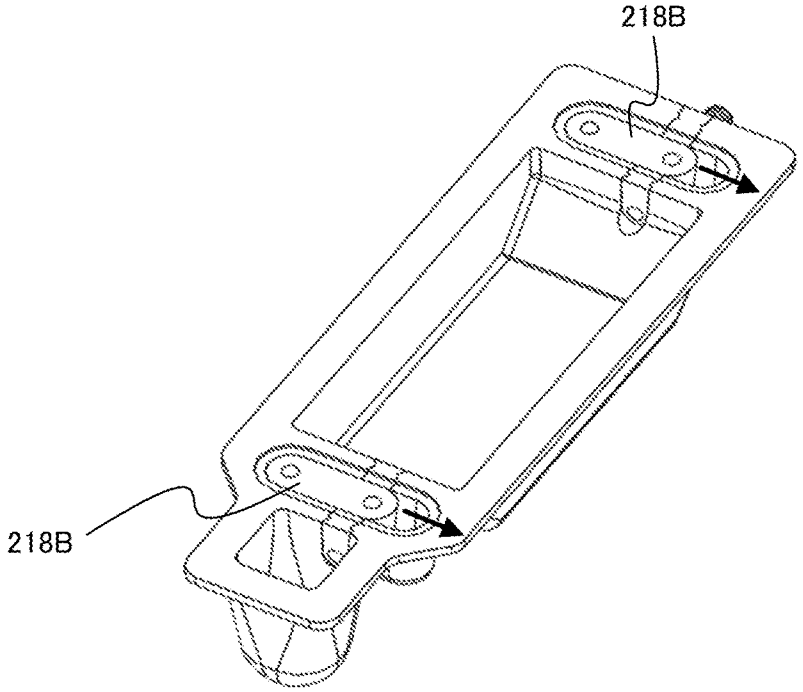

FIG. 15(*a*) illustrates that the slide valves 218B on the waste liquid side and the collecting side are in open states, and FIG. 15(*b*) illustrates that the slide valves 218B on the waste liquid side and the collecting side are in closed states. As for each of the slide valves 218B, one pair of projections provided on a lower surface are moved by the driving motor 219, and the open state and the closed state are thereby switched. The control unit 700 independently controls each of the driving motor 219 of the slide valve 218B on the waste liquid side and the driving motor 219 of the slide valve 218B on the collecting side.

The slide valve 218B is preferably shaped with elastic silicone rubber and is pressed into the recess portion 217B, and it thereby becomes possible to enhance close fitting to the vessel main body 212 by a simple structure. The slide valve 218B has two holes, which are formed in the z direction, in a bottom surface, and two pins (projections) are inserted into the two holes from a lower side of the recess portion 217B. Those pins are simultaneously moved in an opening (or closing) direction by the driving motor 219, and it thereby becomes possible to prevent an increase in a sliding resistance and an occurrence of leakage due to deformation (contraction and expansion) in an action of the slide valve 218B.

Components (a pad 215, the lamination (aluminum) seal 214, and the joint 216Ba) around the slide valve 218B can be formed of polypropylene in the same manner as the vessel main body 212. Contact surfaces of the lamination seal 214 and the vessel main body 212 are welded and integrated, and it thereby becomes possible to prevent liquid leakage from a seal joining surface.

[Extracting Process by Processing System]

The processing system 1000 of the first embodiment executes the following steps in order to separate a plurality of pieces of the first extraction liquid (a liquid mixture of transferrins derived from the liver and the brain) from a plurality of samples such as whole blood in a comparatively large amount (5 to 10 ml).

First, an extracting step of the first extraction liquid is executed. In the extracting step of the first extraction liquid, the control unit 700 of the processing system 1000 moves the plurality of dispensing nozzles 502 of the nozzle unit 500 in the y direction above the plurality of first cartridges 302. Next, by following the method of Patent Literature 2, drawing and discharge by the plurality of dispensing nozzles 502 are performed by using bonds between first-antibody-fixing magnetic beads and lectin, and the plurality of pieces of the first extraction liquid (transferrins) are thereby separated from the plurality of samples such as whole blood. Glycoproteins such as transferrins contained in the first extraction liquid include proteins having different glycans. The plurality of pieces of the first extraction liquid are each retained in a plurality of first extraction liquid wells.

A preparing step for extracting the second extraction liquid from the first extraction liquid is executed. In the preparing step, the control unit 700 transports the first extraction liquid in the plurality of first extraction liquid wells to the plurality of extraction vessels 210 by using the plurality of dispensing nozzles 502. The plurality of dispensing nozzles 502 dispense the plurality of pieces of the first extraction liquid from the dispensing tips 502*a* into the plurality of extraction vessels 210 via the respective dispensing openings 214*a* of the plurality of extraction vessels 210.

In addition, in the preparing step, the control unit 700 transports, in a predetermined procedure, the lectin-fixing magnetic beads LMB to which the lectin is fixed, various kinds of solutions, various kinds of reagents, and so forth, which are each retained in the plurality of second cartridges 304, into the plurality of extraction vessels 210 by using the plurality of dispensing nozzles 502. Note that as disclosed in Patent Literature 1, for example, as the lectin L, a lectin which is specifically bonded to the transferrin TR derived from the brain can be used.

Next, an oscillating step is executed. In the oscillating step, in a state where the magnetic beads to which the lectin is fixed and the plurality of pieces of the first extraction liquid are accommodated in the respective extraction vessels 210, as illustrated in FIG. 8, the control unit 700 oscillates the oscillating body 200S of the extracting device 200 in the calm and predetermined oscillating condition. The calm and predetermined oscillating condition means that a pressure applied to a solution is low compared to drawing and discharge by the dispensing nozzle. The calm and predetermined oscillating condition will be described later in an example. An oscillating condition is configured with the following oscillating angle, oscillating cycle, and/or oscillating time. The oscillating angle of the oscillating body 200S can preferably be set to a range of ±45 degrees relative to a horizontal direction and further preferably to a range of ±30 degrees. The oscillating cycle of the oscillating body 200S can preferably be set to 5 to 30 seconds and further preferably to 3 to 10 seconds. Those oscillating angles and oscillating cycles can optionally be combined. Further, the oscillating time is configured with a plurality of oscillating cycles.

In the first embodiment, when the oscillating body 200S illustrated in FIG. 8 is oscillated, as illustrated in FIG. 7(*a*), the control unit 700 sets oscillating arrangement in which the plurality of magnet columns 242 are lowered and the temperature adjustment unit 251 is elevated.

In the oscillating arrangement, the magnetic force is not exerted on an inside of the extraction vessel 210, and the inside of the extraction vessel 210 is cooled. A cooling temperature of the extraction vessel 210 by the temperature adjustment unit 251 (Peltier device) can be set to a range of 2° C. to 8° C., further preferably to 3° C. to 5° C., and still further preferably to approximately 4° C. Note that as illustrated in FIG. 23, the transferrin TR derived from the brain and the lectin L (lectin-fixing magnetic beads LMB) can be bonded together with comparatively weak affinity at such a cooling temperature.

Figure 23:
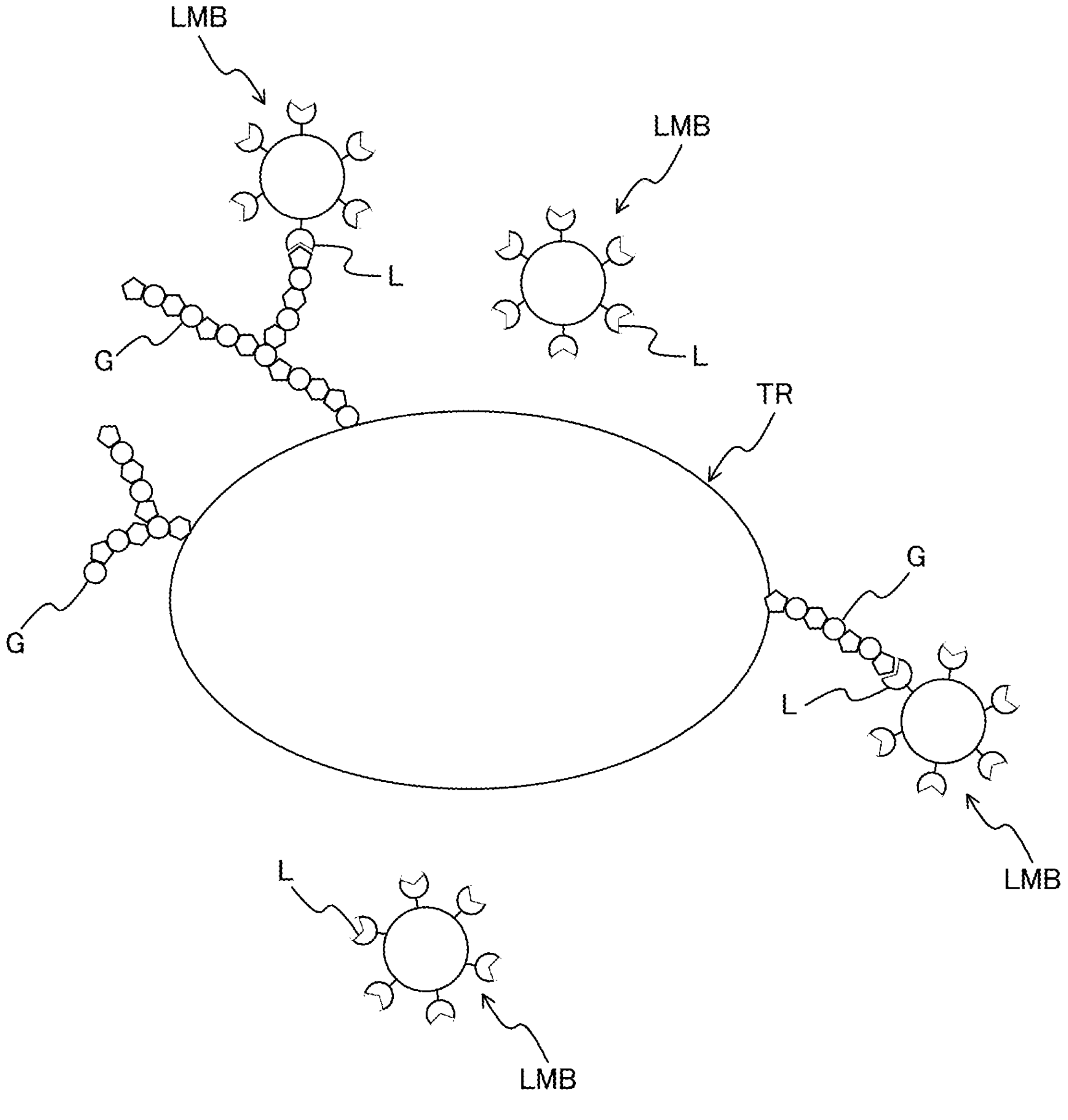
FIG. 23 is a schematic diagram illustrating a bonding state of a transferrin and lectin-fixing magnetic beads.

When oscillation by the oscillating body 200S is executed in the oscillating condition, the oscillating arrangement, and at the cooling temperature, while the transferrin TR derived from the brain is bonded with the lectin-fixing magnetic beads LMB with comparatively weak affinity as illustrated in FIG. 23, a free state is established where the transferrin derived from the liver is free in the solution. In the free state, in the first embodiment, the control unit 700 stops the oscillation of the oscillating body 200S in a horizontal position, and sets the temperature adjustment unit 251 to the lowered state, but establishes magnetic bead adsorption arrangement in which the plurality of magnet columns 242 are elevated as illustrated in FIG. 7(*b*).

Next, a liquid wasting step is executed. In the liquid wasting step of the first embodiment, while maintaining the magnetic bead adsorption arrangement in FIG. 7(*b*), the control unit 700 inclines the oscillating body 200S to a predetermined angle (for example, 45 to 90 degrees) such that the waste liquid tube 216*a* is positioned on the lower side as illustrated in FIG. 8(*a*) and opens a waste liquid valve (the pinch valve (pair of nipping bodies) 218, the two-way valve 218A, or the slide valve 218B) by using the valve driving motor 219. Then, while the lectin-fixing magnetic beads LMB to which the transferrin derived from the brain is bonded are adsorbed onto an inner bottom surface of the extraction vessel 210 by the magnetic force, the solution in which the transferrin derived from the liver is free flows out through the waste liquid tube 216*a* from the inside of the extraction vessel 210 and is dropped and transported to the waste liquid tank 600.

After the liquid wasting step is executed, the control unit 700 returns the oscillating body 200S to a horizontal state. Further, in order to wash the transferrin derived from the liver, the control unit 700 dispenses a washing liquid from the dispensing opening 214*a* and thereafter sequentially executes the oscillating step and the liquid wasting step.

Next, a lectin separating step is executed. In the lectin separating step of the first embodiment, the control unit 700 returns the oscillating body 200S to the horizontal state, sets the temperature adjustment unit 251 to the elevated state, and establishes lectin separating arrangement in which the plurality of magnet columns 242 are lowered as illustrated in FIG. 7(*a*).

In a state of the lectin separating arrangement, the control unit 700 executes oscillation of the oscillating body 200S while performing control such that the temperature in the extraction vessel 210 becomes a predetermined temperature by using the temperature adjustment unit 251. When the solution in the extraction vessel 210 is controlled to the predetermined temperature, three-dimensional structures of the lectin and/or the transferrin derived from the brain are changed, and the transferrin derived from the brain is thereby separated from the lectin-fixing magnetic beads.

When the lectin separating step is finished, a transferrin retrieving step is executed. In the transferrin retrieving step of the first embodiment, while maintaining the magnetic bead adsorption arrangement in FIG. 7(*b*), the control unit 700 inclines the oscillating body 200S to a predetermined angle (for example, 45 to 90 degrees) such that the collecting tube 216*b* is positioned on the lower side as illustrated in FIG. 8(*b*) and opens a collecting valve (the pinch valve (pair of nipping bodies) 218, the two-way valve 218A, or the slide valve 218B) by using the valve driving motor 219. Then, while the lectin-fixing magnetic beads which are not bonded to the transferrin derived from the brain are adsorbed onto the inner bottom surface of the extraction vessel 210 by the magnetic force, the solution which contains the transferrin derived from the brain (second extraction liquid) flows out from the inside of the extraction vessel 210 and is dropped and transported to the second extraction liquid vessel 201.

The control unit 700 moves the second extraction liquid drawn into the plurality of dispensing tips 502*a* to the plurality of measurement wells 402. A detection reagent is dispensed from the third cartridges 306 to the plurality of measurement wells 402. As the detection reagent, the second antibody can be used to which the chemiluminescent substance or the fluorescent substance is fixed and to which the protein (transferrin) is bonded. Subsequently, the control unit 700 uses a detector (such as the PMT) 406 of a detection mechanism 400 and thereby executes detection or quantification of the transferrin derived from the brain in the second extraction liquid in the plurality of measurement wells 402.

Second Embodiment

[Extracting Device]

Figure 16A:
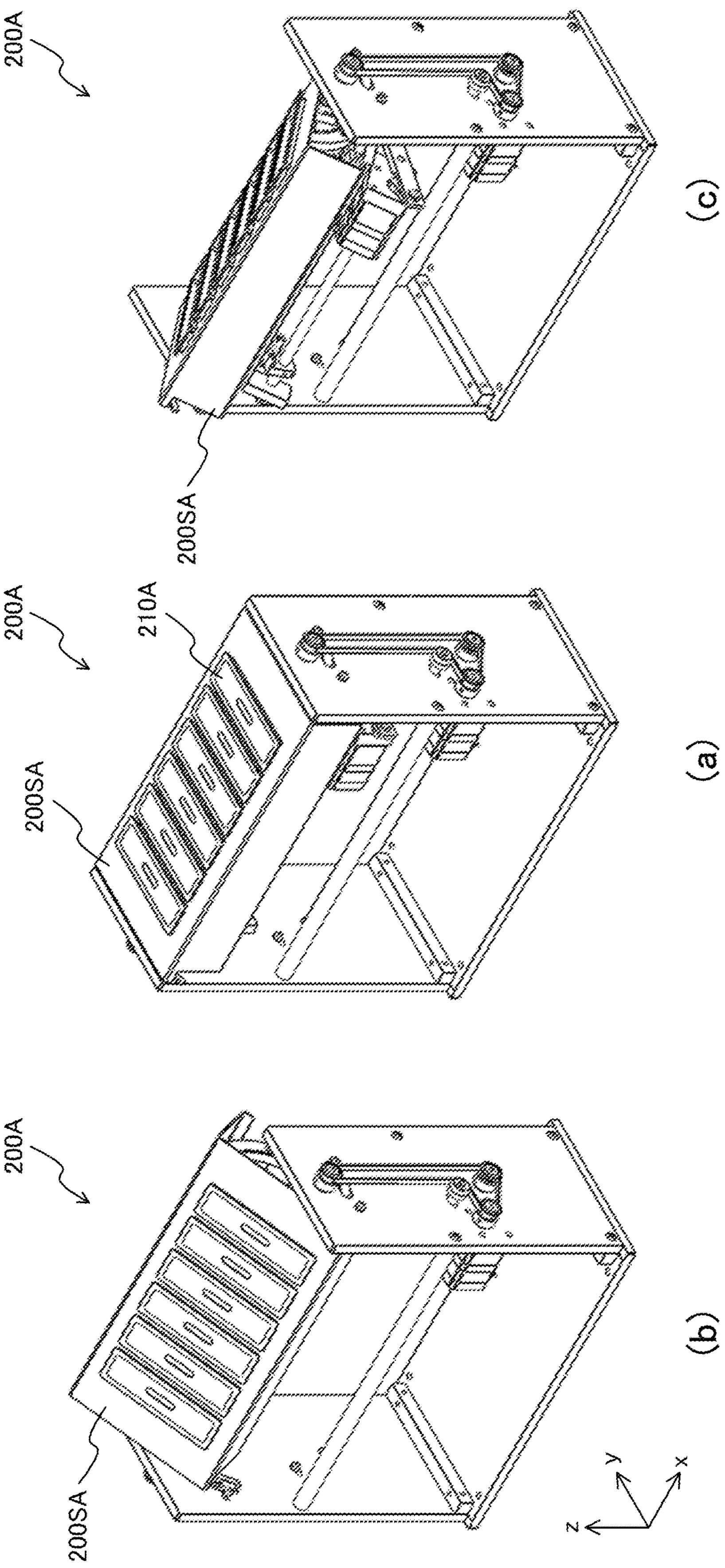
FIG. 16A is an upper perspective view illustrating the oscillating state of the oscillating body in FIG. 16.

The extracting device 200A according to the second embodiment will be described by using FIG. 16 to FIG. 16A. The extracting device 200A includes the oscillating body 200SA which is supported to be capable of being oscillated around the oscillating shaft 226 as a center relative to the base portion (housing) 202. The oscillating body 200SA includes the oscillating mechanism 220 which is equivalent to the oscillating mechanism 220 of the first embodiment. The oscillating body 200SA includes a cover 203, a temperature adjustment unit (heating block) 270 which supports the plurality of extraction vessels 210A to be capable of adjusting the temperature, and one pair of arc-shaped bodies 229 which are oscillated integrally with the temperature adjustment unit 270. As illustrated in FIGS. 1, 16, and 16A, the plurality of extraction vessels 210A are arranged in the x direction.

As illustrated in FIG. 16A and FIG. 17, the oscillating body 200SA can be set to (a) a horizontal state, (b) a first inclined state (counterclockwise rotated state), and (c) a second inclined state (clockwise rotated state). The oscillating body 200SA further includes an oscillating gear (external gear) 226*g* which rotates together with the oscillating shaft 226. The oscillating gear 226*g* meshes with an internal gear 229*g* which is provided in an inner curved surface of the arc-shaped body 229. An outer curved surface of the arc-shaped body 229 is supported by a plurality of support rollers 204 which are rotatably supported by the base portion 202.

When the oscillating mechanism 220 acts, the oscillating gear 226*g* rotates together with the oscillating shaft 226, the internal gears 229*g* of the arc-shaped bodies 229 which mesh with the oscillating gears 226*g* rotate, and the oscillating body 200SA rotationally moves from a state in FIG. 16A(a) and FIG. 17(*a*) to a state in FIG. 16A(b) and FIG. 17(*b*) and from the state in FIG. 16A(a) and FIG. 17(*a*) to a state in FIG. 16A(c) and FIG. 17(*c*).

[Magnet Moving Mechanism]

A magnet moving mechanism 280 according to the second embodiment will be described by using FIG. 18. The magnet moving mechanism 280 is provided in the oscillating body 200SA and is oscillated integrally with the oscillating body 200SA. The magnet moving mechanism 280 is configured with a magnet support body 284 which supports a plate-shaped magnet body 282, a link mechanism 286 which moves the magnet body 282 and the magnet support body 284 relative to an outer surface of an inclined flat surface portion 212A2 of a reaction vessel 210A, and a magnet moving motor 288 which drives the link mechanism 286.

Figure 18:
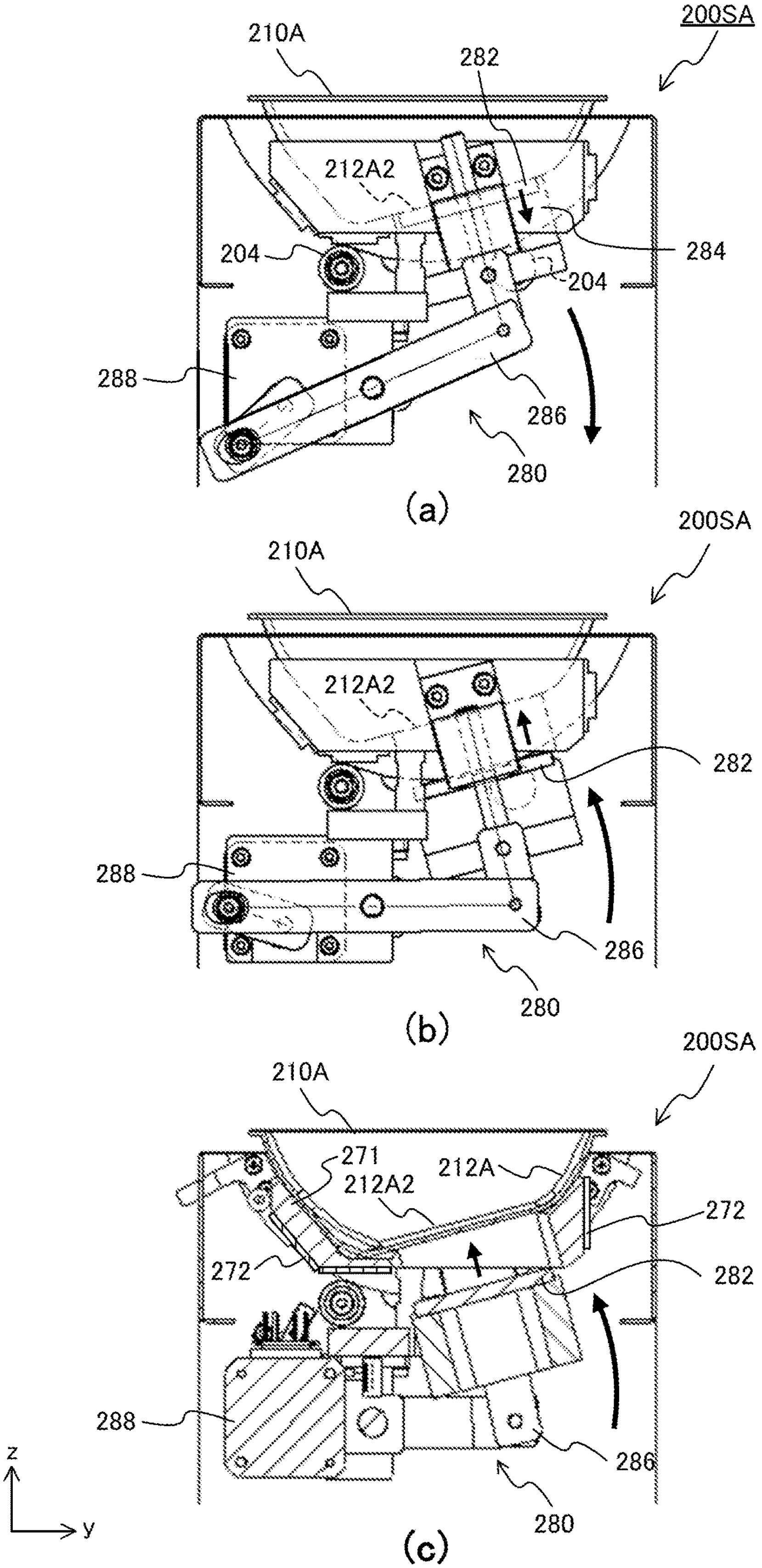
FIG. 18 is a side view illustrating a magnet moving mechanism of the oscillating body in FIG. 16.

FIG. 18(*a*) illustrates a state where the magnet body 282 is in contact with the inclined flat surface portion 212A2 of the reaction vessel 210A. FIG. 18(*b*) illustrates a state where the magnet body 282 is spaced apart from the inclined flat surface portion 212A2 of the reaction vessel 210A. FIG. 18(*c*) illustrates a cross-sectional view of the state in FIG. 18(*a*). The magnet moving mechanism 280 can move the magnet body 282 in arrow directions between the states in FIG. 18(*a*) and in FIG. 18(*b*).

[Temperature Adjustment Unit]

Figure 19:
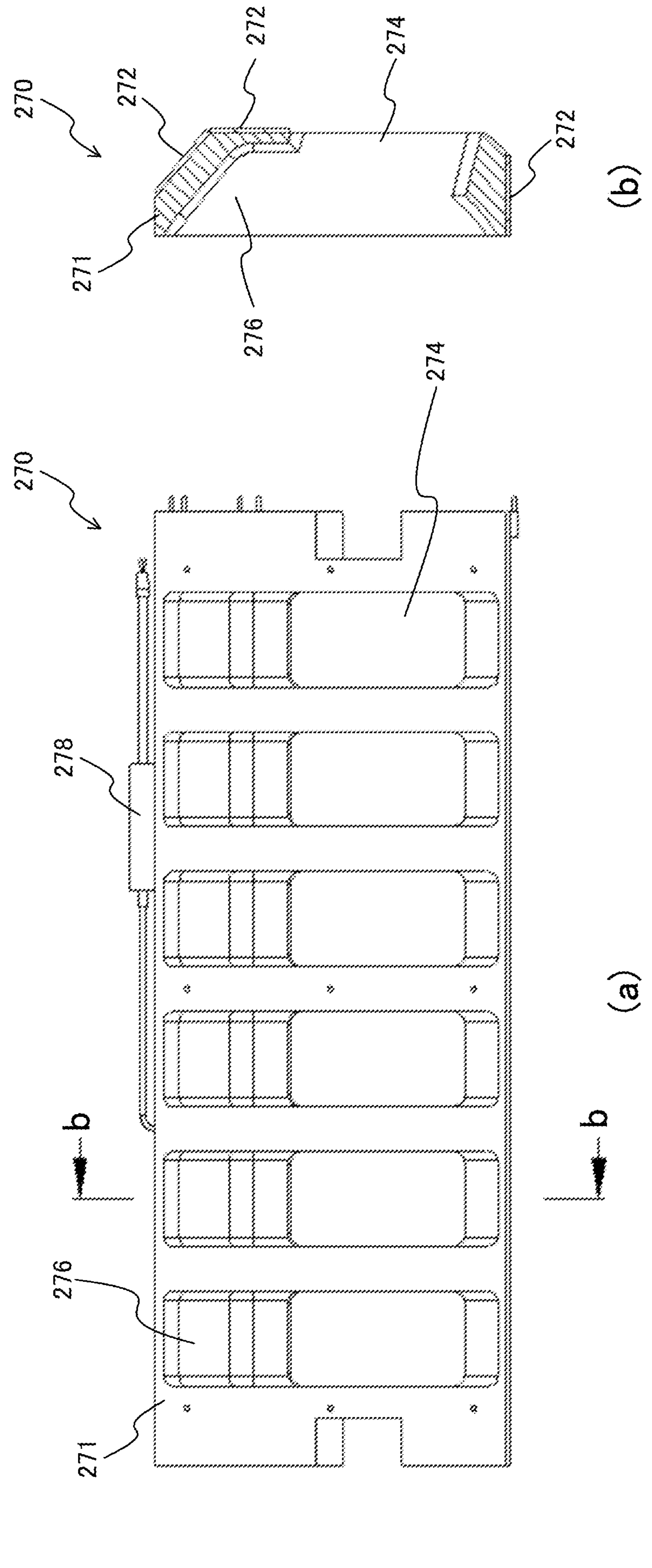
FIG. 19 illustrates a temperature adjustment unit of the oscillating body in FIG. 16, in which FIG. 19(*a*) is a top view and FIG. 19(*b*) is a b-b line cross-sectional view.

The temperature adjustment unit 270 according to the second embodiment will be described by using FIG. 19. The temperature adjustment unit 270 is configured with a metal main body (heat conduction portion) 271, a temperature adjustment bodies (sheet-shaped heating bodies or Peltier devices) 272 which are provided on an outer surface of the metal main body 271, a plurality of opening portions 274 which are provided on a lower surface side of the metal main body 271 so as to movably accommodate a plurality of magnet bodies 282, a plurality of vessel accommodating portions 276 which are provided on an upper surface side of the metal main body 271 so as to accommodate the plurality of extraction vessels 210A, and a temperature sensor 278 which is provided on the outer surface of the metal main body 271. As illustrated in FIG. 18(*c*), the metal main body 271 is arranged between the temperature adjustment bodies 272 and a vessel main body 212A. In a case where the temperature adjustment body 272 is a Peltier device, the Peltier device includes a first heat absorption-dissipation surface which is capable of contacting with the vessel main body 212A of the extraction vessel 210A via the metal main body 271 and a second heat absorption-dissipation surface which does not contact with the vessel main body 212A of an extraction vessel 210A.

[Extraction Vessel]

Figure 20:
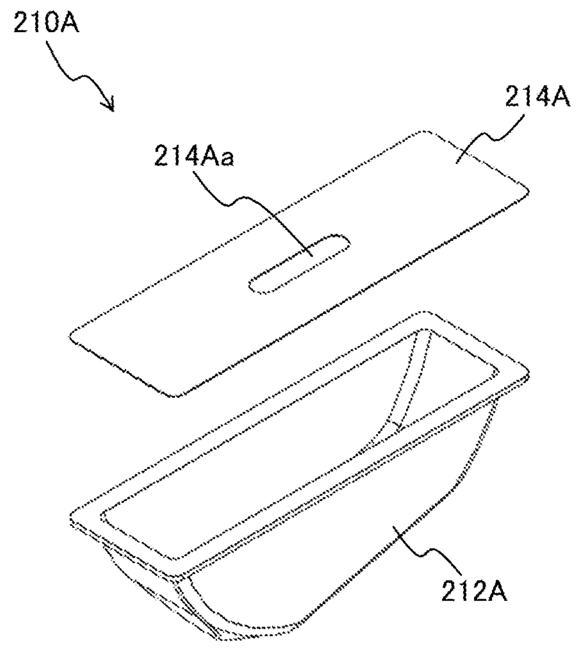
FIG. 20 illustrates an extraction vessel of the oscillating body in FIG. 16, in which FIG. 20(*a*) is an exploded perspective view and FIG. 20(*b*) is a perspective view of a use state.
Figure 20:
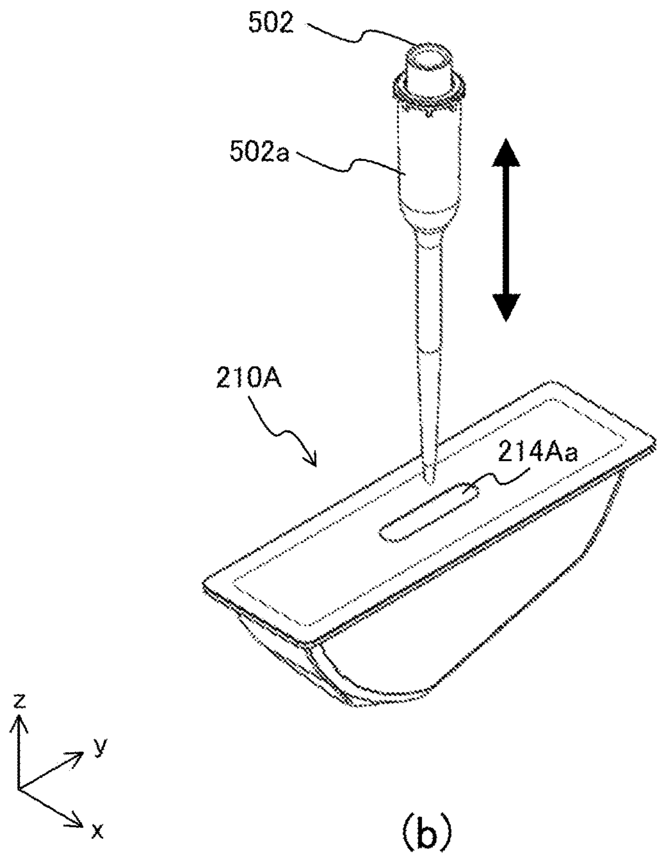

The extraction vessel 210A according to the second embodiment will be described by using FIGS. 20 to 23. The extraction vessel 210A is configured with the vessel main body 212A which accommodates the first extraction liquid dispensed from the dispensing nozzle 502 and a lid body 214A which is fixed to an upper surface of the vessel main body 212A. The lid body 214A is a rectangular plate, and a long and narrow dispensing opening (slit) 214Aa which extends in a longitudinal direction of the lid body 214A is formed in a central portion (around an intersection of diagonal lines) of the lid body 214A. As illustrated in FIG. 20(*b*), the dispensing tip 502*a* attached to the dispensing nozzle 502 is inserted into an internal portion of the extraction vessel 210A via the dispensing opening 214Aa. The inserted dispensing tip 502*a* dispenses the first extraction liquid, various kinds of reagents, and/or various kinds of reagents into the internal portion of the extraction vessel 210A. In addition, the inserted dispensing opening 214Aa draws a waste liquid and/or the second extraction liquid from the internal portion of the extraction vessel 210A. The long and narrow dispensing opening 214Aa preferably extends in a perpendicular direction (y direction) to an axis line (x direction) of the oscillating shaft 226. Note that instead of the long and narrow dispensing opening 214Aa, a circular dispensing opening can be used. The circular dispensing opening can have a diameter of the same length as the length of the long and narrow dispensing opening 214Aa in the longitudinal direction. For example, the circular dispensing opening can have the same length as an x-direction width in the vessel main body 212A.

Figure 21:
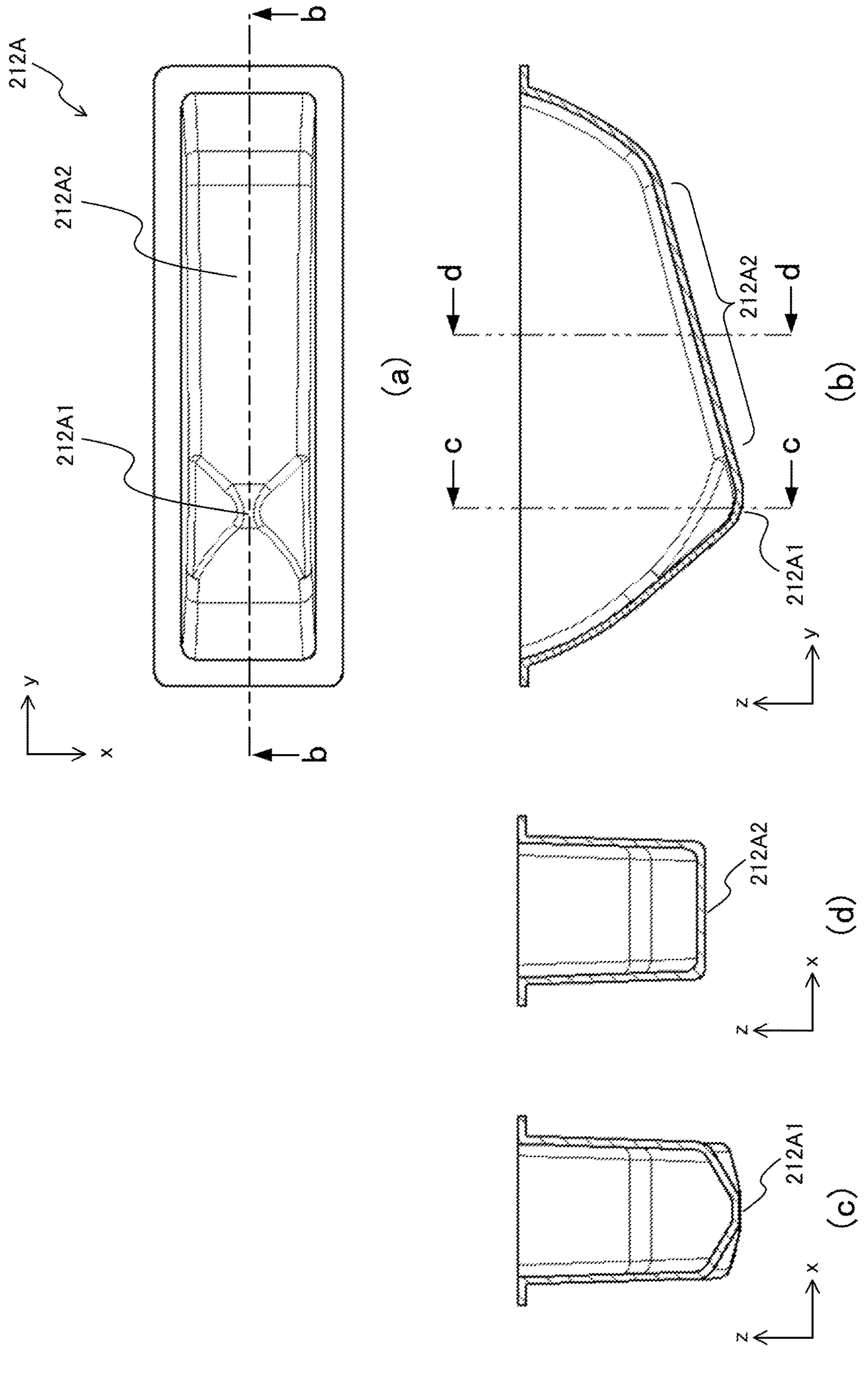
FIG. 21 illustrates a vessel main body of the extraction vessel in FIG. 20, in which FIG. 21(*a*) is a top view, FIG. 21(*b*) is a b-b cross-sectional view, FIG. 21(*c*) is a c-c line cross-sectional view, and FIG. 21(*d*) is a d-d line cross-sectional view.
Figure 22:
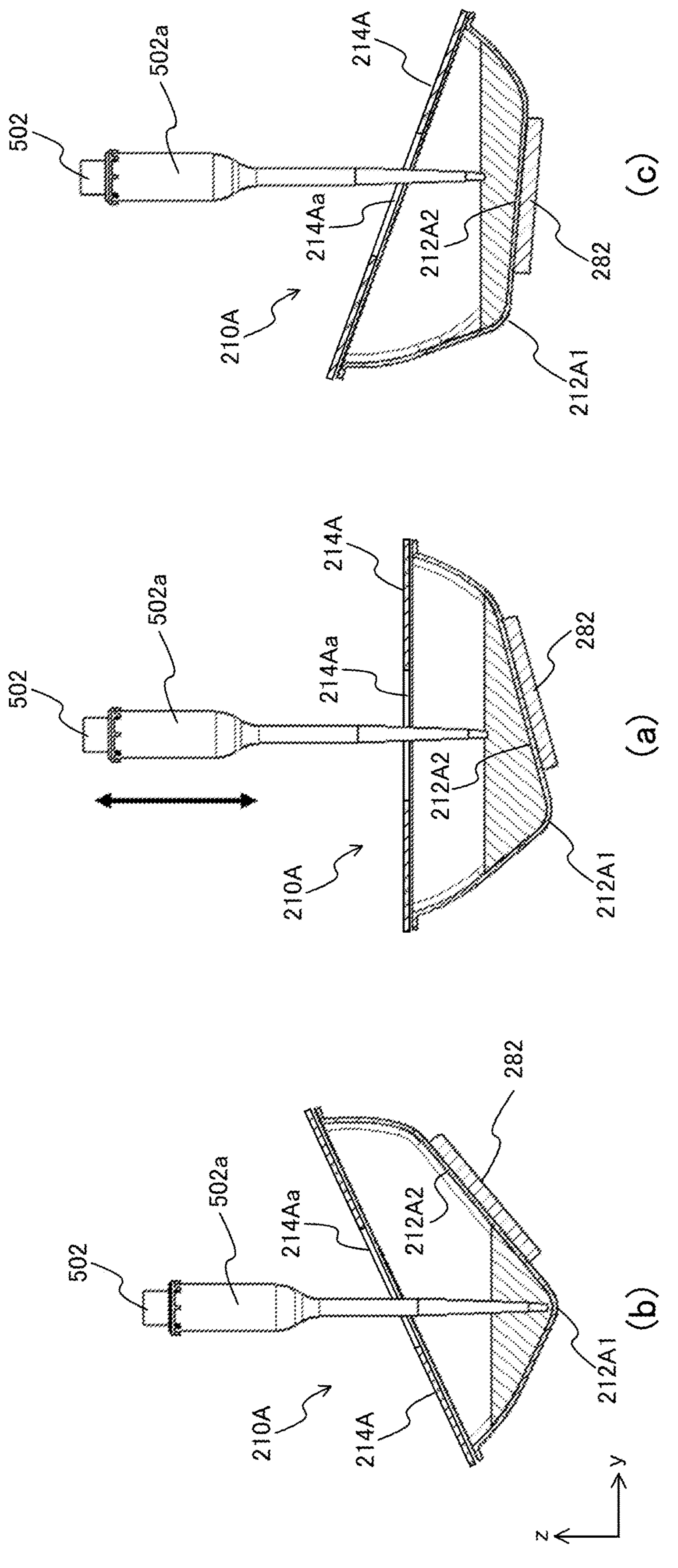
FIG. 22 illustrates cross-sectional views illustrating positions of a dispensing nozzle relative to inclination states of the extraction vessel according to the second embodiment.

As illustrated in FIG. 21, a bottom surface of the vessel main body 212A includes the inclined flat surface portion 212A2 which is inclined relative to the y direction and a lowest portion 212A1 which is connected to a lower end of the inclined flat surface portion 212A2. A periphery of the lowest portion 212A1 is inclined toward the lowest portion (FIG. 21(*c*)). Because the lowest portion 212A1 is formed in a position shifted in the y direction from a center of the extraction vessel 210A (dispensing opening 214Aa) in the horizontal state, a solution in the internal portion of the extraction vessel 210A moves in accordance with rotation and movement of the oscillating body 200SA as illustrated in FIG. 22(*a*) to FIG. 22(*c*). FIG. 22 illustrates a state where the magnet body 282 is in contact with the inclined flat surface portion 212A2 of the vessel main body 210A. In FIG. 22, FIG. 22(*a*) illustrates a state where the lid body 214A of the extraction vessel 210A is horizontal, FIG. 22(*b*) illustrates a state where the extraction vessel 210A is rotationally moved counterclockwise, and FIG. 22(*c*) illustrates a state where the extraction vessel 210A is rotationally moved clockwise.

Even in any state of FIG. 22(*a*) to FIG. 22(*c*), because the dispensing opening 214Aa is a long and narrow hole in the y direction or a sufficiently large hole, the dispensing tip 502*a* of the dispensing nozzle 502 can be inserted into the extraction vessel 210A. As illustrated in FIG. 22(*b*), when the extraction vessel 210A is rotationally moved, an inclination angle of an inclined flat surface 212A2 becomes large, and the solution of the extraction vessel 210A is concentrated in the lowest portion 212A1. Accordingly, by using the dispensing tip 502*a* of the dispensing nozzle 502, the more solution can be drawn from the lowest portion 212A1 of the extraction vessel 210A without waste.

[Extracting Process by Processing System]

The processing system 1000 of the second embodiment executes the following steps in order to separate a plurality of pieces of the first extraction liquid (a liquid mixture of transferrins derived from the liver and the brain) from a plurality of samples such as whole blood in a comparatively large amount (5 to 10 ml).

First, an extracting step of the first extraction liquid is executed. In the extracting step of the first extraction liquid, the control unit 700 of the processing system 1000 moves the plurality of dispensing nozzles 502 of the nozzle unit 500 in the y direction above the plurality of first cartridges 302. Next, by following the method of Patent Literature 2, drawing and discharge by the dispensing tips 502*a* of the plurality of dispensing nozzles 502 are performed by using bonds between the first-antibody-fixing magnetic beads and the lectin, and the plurality of pieces of the first extraction liquid (transferrins or the like) are thereby separated from the plurality of samples such as whole blood. Glycoproteins such as transferrins contained in the first extraction liquid include proteins having different glycans. The plurality of pieces of the first extraction liquid are each retained in a plurality of first extraction liquid wells.

A preparing step for extracting the second extraction liquid from the first extraction liquid is executed. In the preparing step, the control unit 700 transports the first extraction liquid in the plurality of first extraction liquid wells to the plurality of extraction vessels 210A by using the plurality of dispensing nozzles 502. Specifically, the plurality of dispensing tips 502*a* of the plurality of dispensing nozzles 502 dispense the plurality of pieces of the first extraction liquid into the plurality of extraction vessels 210A via the respective dispensing openings 214Aa of the plurality of extraction vessels 210A.

In addition, in the preparing step, the control unit 700 transports, in a predetermined procedure, the lectin-fixing magnetic beads LMB, various kinds of solutions, various kinds of reagents, and so forth, which are each retained in the plurality of second cartridges 304, into the plurality of extraction vessels 210A by using the dispensing tips 502*a* of the plurality of dispensing nozzles 502. Note that as disclosed in Patent Literature 1, for example, as the lectin, a lectin which is specifically bonded to a brain-derived transferrin can be used.

Next, an oscillating step is executed. In the oscillating step, in a state where the magnetic beads to which the lectin is fixed and the plurality of pieces of the first extraction liquid are accommodated in the respective extraction vessels 210A, as illustrated in FIG. 16A and FIG. 17, the control unit 700 oscillates the oscillating body 200SA of the extracting device 200A in the calm and predetermined oscillating condition. The calm and predetermined oscillating condition means that a pressure applied to a solution is low compared to drawing and discharge by the dispensing nozzle. The calm and predetermined oscillating condition will be described later in the example. The oscillating condition is configured with the following oscillating angle, oscillating cycle, and/or oscillating time. The oscillating angle of the oscillating body 200S can preferably be set to a range of ±45 degrees relative to a horizontal direction and further preferably to a range of ±30 degrees. The oscillating cycle of the oscillating body 200S can preferably be set to 5 to 30 seconds and further preferably to 3 to 10 seconds. Those oscillating angles and oscillating cycles can optionally be combined. Further, the oscillating time is configured with a plurality of oscillating cycles.

In oscillating arrangement, the magnetic force is not exerted on an inside of the extraction vessel 210A, and the extraction vessel 210A is cooled by using a Peltier device 272 (FIG. 18(*c*)), and/or a cooling fan 290 (FIG. 17), and so forth. A cooling temperature of the extraction vessel 210A by the Peltier device 272 and/or the cooling fan 290 can be set to a range of 2° C. to 8° C., further preferably to 3° C. to 5° C., and still further preferably to approximately 4° C. Note that as illustrated in FIG. 23, the transferrin TR derived from the brain and the lectin L (lectin-fixing magnetic beads LMB) can be bonded together with comparatively weak affinity at such a cooling temperature.

When oscillation by the oscillating body 200SA is executed in the oscillating condition, the oscillating arrangement, and at the cooling temperature, while the transferrin TR derived from the brain is bonded with the lectin-fixing magnetic beads LMB with comparatively weak affinity, a free state is established where the transferrin derived from the liver is free in the solution. In the free state, in the second embodiment, the control unit 700 stops the oscillation of the oscillating body 200SA in the horizontal position and establishes magnetic bead adsorption arrangement in which the magnet bodies 282 are elevated as illustrated in FIG. 18(*a*).

Next, a liquid wasting step is executed. In the liquid wasting step of the second embodiment, while the magnetic bead adsorption arrangement in FIG. 18(*a*) is maintained, the control unit 700 inclines the extraction vessel 210A to a state illustrated in FIG. 22(*b*). In the state in FIG. 22(*b*), while the lectin-fixing magnetic beads LMB to which the transferrin TR derived from the brain is bonded are adsorbed onto an inner surface of the inclined flat surface portion 212A2 of the extraction vessel 210A by the magnetic force, the solution in the extraction vessel 210A is drawn by the dispensing nozzle 502 by using the dispensing tip 502*a* inserted from the dispensing opening 214Aa. The solution drawn into the dispensing tip 502*a* is discharged to the opening 600A of the waste liquid tank 600.

After the liquid wasting step is executed, the control unit 700 returns the oscillating body 200SA to the horizontal state (FIG. 22(*a*)). Further, in order to wash the transferrin derived from the liver, the control unit 700 dispenses a washing liquid from the dispensing opening 214Aa and thereafter sequentially executes the oscillating step and the liquid wasting step.

Next, a lectin separating step is executed. In the lectin separating step of the second embodiment, the control unit 700 returns the oscillating body 200SA to the horizontal state and establishes lectin separating arrangement in which the magnet body 282 is moved to be spaced apart from the inclined flat surface portion 212Aa as illustrated in FIG. 18(*b*).

In a state of the lectin separating arrangement, the control unit 700 executes oscillation of the oscillating body 200SA while performing control such that the temperature in the extraction vessel 210A becomes a predetermined temperature by the temperature adjustment unit 270 and/or the cooling fan 290. When the solution in the extraction vessel 210A is controlled to the predetermined temperature, three-dimensional structures of the lectin and/or the transferrin TR derived from the brain are changed, and the transferrin derived from the brain is thereby separated from the lectin-fixing magnetic beads MLB.

When the lectin separating step is finished, a transferrin retrieving step is executed. In the transferrin retrieving step of the second embodiment, when the control unit 700 inclines the extraction vessel 210A to the state in FIG. 22(*b*) while the magnetic bead adsorption arrangement in FIG. 18(*a*) is maintained, the lectin-fixing magnetic beads LMB which are not bonded to the transferrin derived from the brain are adsorbed onto the inner surface of the inclined flat surface portion 212A2 of the extraction vessel 210A by the magnetic force, but the solution containing the transferrin derived from the brain (second extraction liquid) is drawn from the lowest portion 212A1 by using the dispensing tip 502*a* mounted on the dispensing nozzle 502.

The control unit 700 moves the nozzle unit 500 and thereby moves the second extraction liquid drawn into the plurality of dispensing tips 502*a* of the plurality of dispensing nozzles 502 to the plurality of measurement wells 402. A detection reagent is dispensed from the third cartridges 306 to the plurality of measurement wells 402. As the detection reagent, the second antibody can be used to which the chemiluminescent substance or the fluorescent substance is fixed and to which the protein (transferrin) is bonded. Subsequently, the control unit 700 uses the detector (such as the PMT) 406 of the detection mechanism 400 and thereby executes detection or quantification of the transferrin derived from the brain in the second extraction liquid in the plurality of measurement wells 402.

[Lectin-Fixing Magnetic Beads]

A description will be made about capturing of the transferrin TR derived from the brain by using the lectin-fixing magnetic beads LMB which are used in the first and second embodiments. As illustrated in FIG. 23, the lectin L which is specifically bonded to the transferrin TR derived from the brain is fixed to a surface of the lectin-fixing magnetic bead LMB. The transferrin TR is a glycoprotein which includes glycans G extending from a protein P. At a cooling temperature (for example, approximately 4° C.), the lectin L is bonded to the glycan G with weak affinity, and the transferrin TR can thereby be captured by using the lectin-fixing magnetic beads LMB.

(Modification of Temperature Adjustment Unit)

In the first embodiment, the temperature adjustment unit 251 is configured to rotationally move integrally with the oscillating body 200S and to heat or cool the internal portion of the extraction vessel 210 by contacting with a bottom portion of the vessel main body 212. In the second embodiment, the temperature adjustment unit 270 is configured to rotationally move integrally with the oscillating body 200SA and to heat or cool the internal portion of the extraction vessel 210A by contacting with the inclined flat surface portion (bottom surface) 212A2 of the vessel main body 212A. On the other hand, a temperature adjustment unit according to a modification does not rotationally move integrally with the oscillating body 200S or 200SA but can be provided as one or more air conditioning apparatuses (air conditioners) which are provided in the base portion (housing) 202 of the extracting device 200 or 200A or in the base portion (housing) 100 of the system 1000. The temperature adjustment unit is not provided on the oscillating body side but is provided on the base portion side, a weight of the oscillating body 200S or 200SA is thereby reduced, and a structure of the oscillating mechanism is simplified.

Example

A processing process by the nozzle unit 500 and the oscillating body 200S or 200SA according to the first and second embodiments is indicated as an example in table 1. The processing process in table 1 is executed following a control program which is executed in advance by the control unit 700. As indicated in table 1, oscillating parameters which define the processing process are defined by an inclination angle of the extraction vessel 200 or 200A (an inclination angle of the lid body 214 or 214A), an inclination speed about the inclination angle, an acceleration about the inclination angle, a deceleration about the inclination angle, repetitions or a time of each step, and a waiting time between repetitions.

TABLE 1

| Oscillating parameters | Dispensing sample | Dispensing reagent | STEP-1 | Magnet movement | Liquid discharge | Dispensing reagent | STEP-2 |
|---|---|---|---|---|---|---|---|
| | →→→→→→ Process flow →→→→→→ | | | | | | |
| Inclination angle | 10 mL | Reagent A: 40 mL | 30° | Magnet ON | Discharge whole liquid | Reagent B: 40 mL | 20° |
| Inclination speed | | | 1°/s | | | | 0.1°/s |
| Acceleration | | | $0.5°/s^2$ | | | | $0.05°/s^2$ |
| Deceleration | | | $0.5°/s^2$ | | | | $0.05°/s^2$ |
| Repetitions and time | | | 20 s | | | | 10 repetitions |
| Waiting time | | | 0.5 s | | | | 1.5 s |

The "calm and predetermined oscillating condition" which is mentioned in the first and second embodiment is defined in step 2 in table 1 as examples. The oscillating condition in step 2 is changeable in predetermined ranges as follows. The inclination angle in step 2 can be determined in angle ranges of ±15° to ±25° relative to the horizontal state (FIG. 11, FIG. 16, and FIG. 22(*a*)) of the vessel main body (lid body). The inclination speed in step 2 can be determined in a speed range of 0.8°/s to 1.2°/s. The acceleration or deceleration in step 2 can be determined in ranges of $0.03°/s^2$ to $0.06°/s^2$. The repetitions in step 2 can be determined in a range of 7 repetitions to 13 repetitions. The waiting time between repetitions in step 2 can be determined in a range of 1.0 to 3.0 s. The oscillating parameters can optionally be combined.

REFERENCE SIGNS LIST

1000 processing system
100 base portion
200 extracting device
200S oscillating body
210 extraction vessel
214*a* dispensing opening
216*a* waste liquid tube path
216*b* collecting tube path
220 oscillating mechanism
242 magnet column
251 temperature adjustment unit
400 detection mechanism
500 nozzle unit
502 dispensing nozzle
200A extracting device
200SA oscillating body
210A extraction vessel
270 temperature adjustment unit (heating block)
280 magnet moving mechanism
282 magnet body

The invention claimed is:

1. An extracting device extracting a bio-related substance from a sample by using magnetic particles, the extracting device comprising:

a plurality of extraction vessels which retain a solution containing the magnetic particles and the sample and which are arranged in a first direction;

one or more magnet bodies which exert a magnetic force on the plurality of extraction vessels;

a magnet moving mechanism which configured to move the one or more magnet bodies between a contact position in which the one or more magnet bodies are in contact with the plurality of extraction vessels and a non-contact position in which the one or more magnet bodies are not in contact with the plurality of extraction vessels;

an oscillating mechanism which configured to oscillate the plurality of extraction vessels and the magnet moving mechanism;

a control unit which configured to control actions of the oscillating mechanism and the one or more magnet moving mechanisms;

a nozzle unit which has a plurality of dispensing nozzles arranged in the first direction and a nozzle moving mechanism configured to move the plurality of dispensing nozzles in a second direction different from the first direction;

wherein the oscillating mechanism includes an oscillating shaft which extends in the first direction, each of the plurality of extraction vessels includes a vessel main body storing a solution and a lid body covering the vessel main body, wherein the lid body includes a dispensing opening;

wherein the vessel main body includes an inclined flat surface portion which is inclined relative to the second direction;

wherein the vessel main body includes a lowest portion which is connected to a lower end of the inclined flat surface portion;

wherein a periphery of the lowest portion is inclined toward the lowest portion; and wherein the lowest portion is formed in a position which is shifted from a center of the extraction vessel in the second direction.

2. The extracting device according to claim 1, wherein the magnet moving mechanism moves the one or more magnet bodies relative to an outer surface of the inclined flat surface portion.

3. The extracting device according to claim 1, wherein the extraction vessel includes, on one side surface, a waste liquid tube and a waste liquid valve which adjusts a flow of a liquid passing through the waste liquid tube and includes, on another side surface, a collecting tube and a collecting valve which adjusts a flow of a liquid passing through the collecting tube.

4. The extracting device according to claim 1, wherein the extracting device includes a vessel main body and the vessel main body includes a flat bottom surface and an inclined side surface which is connected to the flat bottom surface.

5. The extracting device according to claim 1, comprising a temperature adjustment unit moving mechanism which moves a one or more temperature adjustment units between a contact position in which the one or more temperature adjustment units are in contact with the plurality of extraction vessels and a non-contact position in which the one or more temperature adjustment units are not in contact with the plurality of extraction vessels, wherein the control unit controls actions of the one or more temperature adjustment units.

6. The extracting device according to claim 1, wherein the temperature adjustment unit is configured with a heater or a Peltier device and a heat conduction portion which is arranged between the heater or the Peltier device and the vessel main body.

7. The extracting device according to claim 1, comprising an oscillating body which is oscillated by the oscillating mechanism, wherein the oscillating body includes the plurality of extraction vessels, the one or more magnet bodies, the magnet moving mechanism, and the temperature adjustment unit.

8. The extracting device according to claim 1, wherein the control unit oscillates the oscillating body in a state where at least the magnetic body is set in the contact position or the non-contact position.

9. The extracting device according to claim 1, wherein the control unit oscillates the extraction vessel at an inclination speed in a speed range of 0.8°/s to 1.2°/s by controlling the oscillating mechanism.

10. The extracting device according to claim 9, wherein the control unit oscillates the extraction vessel in inclination angles in an angle range of ±15° to ±25° by controlling the oscillating mechanism.

11. The extracting device according to claim 10, wherein the control unit controls the oscillating mechanism such that the oscillating mechanism repeats one oscillating action, which is configured with the inclination speed and the inclination angles, a plurality of times.

12. The extracting device according to claim 1, comprising one or more temperature adjustment units which adjust a temperature of the plurality of extraction vessels.

13. A processing system processing the bio-related substance, the processing system comprising:
the extracting device according to claim 1;
the plurality of extraction vessels which are arranged in the first direction;
a plurality of dispensing nozzles which are arranged in the first direction; and
a plurality of cartridges which retain various kinds of reagents and/or solutions to be used for an extracting process, wherein
the plurality of cartridges are arranged in a second direction which is different from the first direction.

14. The processing system according to claim 13, comprising:
a nozzle unit which supports the plurality of dispensing nozzles such that the plurality of dispensing nozzles are movable in the second direction.

15. The processing system according to claim 13, comprising:
a measurement unit which measures each of a plurality of bio-related substances extracted in the plurality of extraction vessels.

* * * * *